(12) United States Patent
Shah et al.

(10) Patent No.: US 10,618,799 B2
(45) Date of Patent: Apr. 14, 2020

(54) CUSHIONING NETWORK STRUCTURES, AND METHODS OF MANUFACTURING THEREOF

(71) Applicant: Dow Global Technologies LLC, Midland, MI (US)

(72) Inventors: Viraj Shah, Pearland, TX (US); Rajen M. Patel, Lake Jackson, TX (US); Selim Bensason, Rueschlikon (CH)

(73) Assignee: Dow Global Technologies LLC, Midland, MI (US)

( * ) Notice: Subject to any disclaimer, the term of this patent is extended or adjusted under 35 U.S.C. 154(b) by 187 days.

(21) Appl. No.: 15/539,880

(22) PCT Filed: Feb. 10, 2016

(86) PCT No.: PCT/US2016/017223
§ 371 (c)(1),
(2) Date: Jun. 26, 2017

(87) PCT Pub. No.: WO2016/130602
PCT Pub. Date: Aug. 18, 2016

(65) Prior Publication Data
US 2017/0369302 A1 Dec. 28, 2017

Related U.S. Application Data

(60) Provisional application No. 62/115,865, filed on Feb. 13, 2015.

(51) Int. Cl.
*B68G 5/00* (2006.01)
*B68G 7/00* (2006.01)
(Continued)

(52) U.S. Cl.
CPC ............. *B68G 5/00* (2013.01); *B68G 7/00* (2013.01); *C08F 10/02* (2013.01);
(Continued)

(58) Field of Classification Search
USPC .............................. 428/92, 311.11, 86, 196
See application file for complete search history.

(56) References Cited

U.S. PATENT DOCUMENTS

| | | |
|---|---|---|
| 4,634,739 A | 1/1987 | Vassilatos |
| 4,952,265 A | 8/1990 | Yamanaka et al. |
| | (Continued) | |

OTHER PUBLICATIONS

PCTUS2016/017223, International Preliminary Report on Patentability dated Aug. 15, 2017.
(Continued)

*Primary Examiner* — Lynda Salvatore

(57) ABSTRACT

A cushioning network structure comprising a plurality of random loops arranged in a three-dimensional orientation, wherein the plurality of random loops are formed from an ethylene/a-olefin interpolymer composition having a highest DSC temperature melting peak in the range of from 90.0° C. to 115.0° C.; a zero shear viscosity ratio (ZSVR) in the range from 1.40 to 2.10; a density in the range of from 0.860 to 0.925 g/cc, a melt index (I2) in a range of from 1 to 25 g/10 minutes when measured according to ASTM D1238 at 190° C. and 2.16 kg, a molecular weight distribution (Mw/Mn) in the range of from 2.0 to 4.5.

18 Claims, 3 Drawing Sheets

(51) Int. Cl.
   *C08L 23/08*   (2006.01)
   *B29C 48/05*   (2019.01)
   *B29C 48/88*   (2019.01)
   *B29K 23/00*   (2006.01)
   *D04H 3/007*   (2012.01)
   *D04H 3/018*   (2012.01)
   *C08F 10/02*   (2006.01)
   *D04H 3/16*    (2006.01)
   *D04H 3/03*    (2012.01)

(52) U.S. Cl.
   CPC .......... *C08L 23/0815* (2013.01); *D04H 3/007* (2013.01); *D04H 3/018* (2013.01); *D04H 3/03* (2013.01); *D04H 3/16* (2013.01); *B29C 48/05* (2019.02); *B29C 48/919* (2019.02); *B29K 2023/08* (2013.01); *C08L 2205/025* (2013.01)

(56) References Cited

U.S. PATENT DOCUMENTS

| | | | |
|---|---|---|---|
| 7,622,179 B2 * | 11/2009 | Patel | D04H 1/02 |
| | | | 428/92 |
| 7,625,629 B2 | 12/2009 | Takaoka | |
| 2006/0198983 A1 | 9/2006 | Patel | |
| 2014/0248816 A1 | 9/2014 | Bonavoglia et al. | |
| 2016/0122925 A1 | 5/2016 | Shah et al. | |

OTHER PUBLICATIONS

PCTUS2016/017223, International Search Report and Written Opinion dated May 24, 2016.

\* cited by examiner

CUSHIONING NETWORK STRUCTURES, AND METHODS OF MANUFACTURING THEREOF

TECHNICAL FIELD

Embodiments of the present disclosure generally relate to cushioning network structures having a plurality of random loops arranged in a three-dimensional orientation, and specifically relate to cushioning network structures wherein the plurality of random loops comprise an ethylene/α-olefin interpolymer composition.

BACKGROUND

Polyurethane foam is often used as a cushioning material for various articles, such as, for example, bed mattresses, seat cushions, back rest cushions, pillows, upholstered furniture, or any other article where support and/or cushioning is desired. The cushioning materials may be used to bear and distribute the weight of a user, thereby providing the desired support and comfort while balancing durability for a given application. Despite the durability and cushioning function that polyurethane foam has been known to offer, it can suffer from certain drawbacks. For instance, polyurethane foam can retain water and moisture leaving the foam susceptible to breeding bacteria. It may also absorb heat and lack suitable breathability, thus making the upper surface of the polyurethane foam warm. During the hotter months, the warm upper surface of the polyurethane foam can become uncomfortable to a user. Further, polyurethane foam may not be easy to reuse or recycle. Discarded polyurethane foam is generally incinerated or buried, which are undesirable options from an environmental and cost standpoint.

Accordingly, alternative cushioning network structures that provide suitable durability and cushioning function, while also providing breathability and recyclability, may be desirable.

SUMMARY

Disclosed in embodiments herein are cushioning network structures. The cushioning network structures comprise a plurality of random loops arranged in a three-dimensional orientation, wherein the plurality of random loops are formed from an ethylene/α-olefin interpolymer composition having a highest DSC temperature melting peak in the range of from 90.0° C. to 115.0° C.; a zero shear viscosity ratio (ZSVR) in the range from 1.40 to 2.10; a density in the range of from 0.860 to 0.925 g/cc; a melt index (I2) in a range of from 1 to 25 g/10 minutes when measured according to ASTM D1238 at 190° C. and 2.16 kg; and a molecular weight distribution (Mw/Mn) in the range of from 2.0 to 4.5.

Also disclosed herein are methods of manufacturing a cushioning network structure comprising a plurality of random loops arranged in a three-dimensional orientation. The methods comprise providing an ethylene/α-olefin interpolymer composition having a highest DSC temperature melting peak in the range of from 90.0° C. to 115.0° C.; a zero shear viscosity ratio (ZSVR) in the range from 1.40 to 2.10; a density in the range of from 0.860 to 0.925 g/cc, a melt index (I2) in a range of from 1 to 25 g/10 minutes when measured according to ASTM D1238 at 190° C. and 2.16 kg, a molecular weight distribution (Mw/Mn) in the range of from 2.0 to 4.5; and forming the ethylene/α-olefin interpolymer composition into a plurality of random loops having a three-dimensional orientation to form a cushioning network structure.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
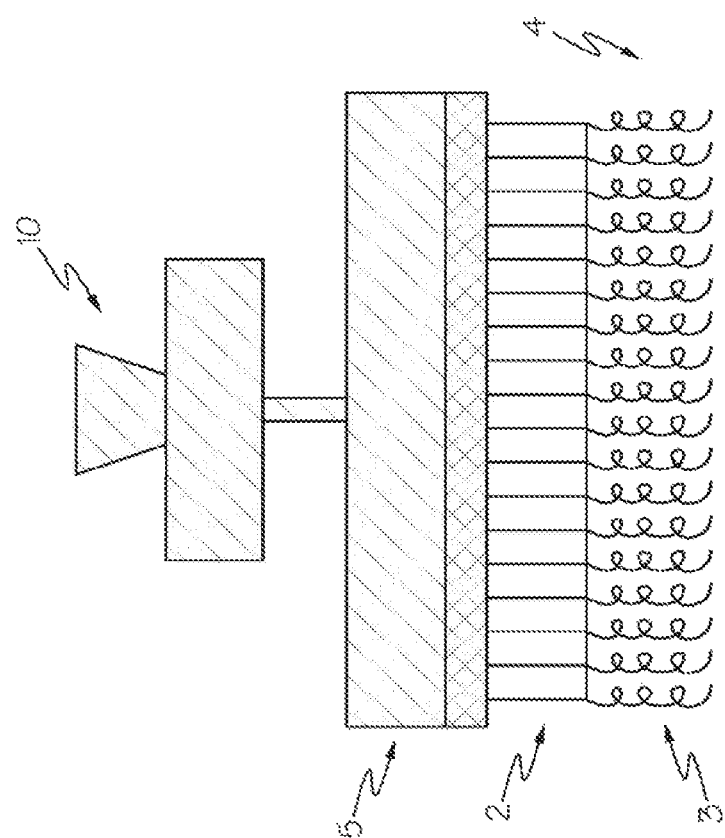
FIG. 1 schematically depicts fiber formation of an exemplary ethylene/α-olefin interpolymer composition according to one or more embodiments herein in a water cooling unit disposed downstream of an extruder.

Reference will now be made in detail to embodiments of cushioning network structures, and methods of manufacturing cushioning network structures, characteristics of which are illustrated in the accompanying drawings. The cushioning network structures may be used in mattresses, cushions, pillows, upholstered furniture, or any other article where support and/or cushioning is desired. It is noted, however, that this is merely an illustrative implementation of the embodiments disclosed herein. The embodiments may be applicable to other technologies that are susceptible to similar problems as those discussed above. For example, the cushioning network structures described herein may be used in cushioned mats, cushioned floor pads, footwear inserts, etc., all of which are within the purview of the present embodiments.

Cushioning Network Structures

The cushioning network structures comprise a plurality of random loops arranged in a three-dimensional orientation. The plurality of random loops is formed from an ethylene/α-olefin interpolymer composition. As used herein, "polymer" means a polymeric compound prepared by polymerizing monomers, whether of the same or a different type. The generic term "polymer" embraces the terms "homopolymer," "copolymer," "terpolymer" as well as "interpolymer." "Interpolymer" refers to a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

"Ethylene/α-olefin interpolymer" generally refers to polymers comprising ethylene and an α-olefin having 3 or more carbon atoms. In embodiments herein, the ethylene/α-olefin interpolymer comprises greater than 50 wt. % of the units derived from ethylene and less than 30 wt. % of the units derived from one or more alpha-olefin comonomers (based on the total amount of polymerizable monomers). All individual values and subranges of greater than 50 wt. % of the units derived from ethylene and less than 30 wt. % of the units derived from one or more alpha-olefin comonomers are included and disclosed herein. For example, in some embodiments, the ethylene/α-olefin interpolymer comprises (a) greater than or equal to 55%, for example, greater than or equal to 60%, greater than or equal to 65%, greater than or equal to 70%, greater than or equal to 75%, greater than or equal to 80%, greater than or equal to 85%, greater than or equal to 90%, greater than or equal to 92%, greater than or equal to 95%, greater than or equal to 97%, greater than or equal to 98%, greater than or equal to 99%, greater than or equal to 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene; and (b) less than 30 percent, for example, less than 25 percent, or less than 20 percent, less than 18%, less than 15%, less than 12%, less than 10%, less than 8%, less than 5%, less than 4%, less than 3%, less than 2%, less than 1%, from 0.1 to 20%, from 0.1 to 15%, 0.1 to 12%, 0.1 to 10%, 0.1 to 8%, 0.1 to 5%, 0.1 to 3%, 0.1 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more α-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable alpha-olefin comonomers typically have no more than 20 carbon atoms. The one or more alpha-olefins may be selected from the group consisting of C3-C20 acetylenically unsaturated monomers and C4-C18 diolefins. For example, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The one or more alpha-olefin comonomers may, for example, be selected from the group consisting of propylene, 1-butene, 1-hexene, and 1-octene; or in the alternative, from the group consisting of 1-butene, 1-hexene and 1-octene, or in the alternative, from the group consisting of 1-hexene and 1-octene. In some embodiments, the ethylene-based polymer comprises greater than 0 wt. % and less than 30 wt. % of units derived from one or more of 1-octene, 1-hexene, or 1-butene comonomers.

Any conventional ethylene (co)polymerization reaction processes may be employed to produce the ethylene/α-olefin interpolymer composition. Such conventional ethylene (co)polymerization reaction processes include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof.

In embodiments herein, the ethylene/α-olefin interpolymer composition is prepared via a process comprising polymerizing ethylene and one or more α-olefins in the presence of a catalyst to form a semi-crystalline polymer in a single reactor. In some embodiments, the catalyst may comprise a biphenylphenolic polymerization catalyst having a procatalyst component comprising a metal-ligand complex corresponding to the formula:

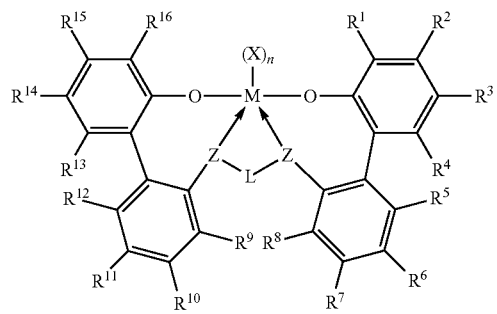

wherein:
M is titanium, zirconium, or hafnium, each independently being in a formal oxidation state of +2, +3, or +4; and
n is an integer of from 0 to 3, and wherein when n is 0, X is absent; and
Each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and
Each Z independently is O, S, N($C_1$-$C_{40}$)hydrocarbyl, or P($C_1$-$C_{40}$)hydrocarbyl; and
O is O (an oxygen atom);
L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in formula (I) (to which L is bonded) or the ($C_1$-$C_{40}$)heterohydrocarbylene has a portion that comprises a 1-atom to 10-atom linker backbone linking the two Z groups in formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$)hydrocarbyl or ($C_1$-$C_{30}$) heterohydrocarbyl; and
$R^{1-16}$ are selected from the group consisting of a ($C_1$-$C_{40}$) hydrocarbyl, ($C_1$-$C_{40}$)heterohydrocarbyl, Si($R^C$)$_3$, Ge($R^C$)$_3$, P($R^C$)$_2$, N($R^C$)$_2$, O$R^C$, S$R^C$, NO$_2$, CN, CF$_3$, $R^C$S(O), $R^C$S (O)$_2$, ($R^C$)$_2$C=N, $R^C$C(O)O, $R^C$OC(O), $R^C$C(O)N(R), ($R^C$)$_2$NC(O), halogen atom, hydrogen atom, and combination thereof.

In an alternative embodiment, each of the $(C_1-C_{40})$hydrocarbyl, $(C_1-C_{40})$heterohydrocarbyl, $Si(R^C)_3$, $Ge(R^C)_3$, $P(R^C)_2$, $N(R^C)_2$, $OR^C$, $SR^C$, $NO_2$, $CN$, $CF_3$, $R^CS(O)$, $R^CS(O)_2$, $(R^C)_2C=N$, $R^CC(O)O$, $R^COC(O)$, $R^CC(O)N(R)$, $(R^C)_2NC(O)$ groups independently is unsubstituted or substituted with one or more $R^S$ substituents, and wherein each $R^S$ independently is a halogen atom, polyfluoro substitution, perfluoro substitution, unsubstituted $(C_1-C_{18})$alkyl, $F_3C$, $FCH_2O$, $F_2HCO$, $F_3CO$, $(R^C)_3Si$, $(R^C)_3Ge$, $(R^C)O$, $(R^C)S$, $(R^C)S(O)$, $(R^C)S(O)_2$, $(R^C)_2P$, $(R^C)_2N$, $(R^C)_2C=N$, $NC$, $(R^C)C(O)O$, $(R^C)OC(O)$, $(R^C)C(O)N(R^C)$, or $(R^C)_2NC(O)$, or two of the $R^S$ are taken together to form an unsubstituted $(C_1-C_{18})$alkylene, wherein each $R^S$ independently is an unsubstituted $(C_1-C_{18})$alkyl.

In an alternative embodiment, each of the aryl, heteroaryl, hydrocarbyl, heterohydrocarbyl, $Si(R^C)_3$, $Ge(R^C)_3$, $P(R^P)_2$, $N(R^N)_2$, $OR^C$, $SR^C$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, hydrocarbylene, and heterohydrocarbylene groups independently is unsubstituted or substituted with one or more $R^S$ substituents; and Each $R^S$ independently is a halogen atom, polyfluoro substitution, perfluoro substitution, unsubstituted $(C_1-C_{18})$alkyl, $F_3C$—, $FCH_2O$—, $F_2HCO$—, $F_3CO$—, $R_3Si$—, $R_3Ge$—, $RO$—, $RS$—, $RS(O)$—, $RS(O)_2$—, $R_2P$—, $R_2N$—, $R_2C=N$—, $NC$—, $RC(O)O$—, $ROC(O)$—, $RC(O)N(R)$—, or $R_2NC(O)$—, or two of the $R^S$ are taken together to form an unsubstituted $(C_1-C_{18})$alkylene, wherein each R independently is an unsubstituted $(C_1-C_{18})$alkyl.

In some embodiments, each of the chemical groups (e.g., X, L, $R^{1-16}$, etc.) of the metal-ligand complex of formula (I) may be unsubstituted, that is, can be defined without use of a substituent $R^S$, provided the above-mentioned conditions are satisfied. In other embodiments, at least one of the chemical groups of the metal-ligand complex of formula (I) independently contain one or more of the substituents $R^S$. Preferably, accounting for all chemical groups, there are not more than a total of 20 $R^S$, more preferably not more than a total of 10 $R^S$, and still more preferably not more than a total of 5 $R^S$ in the metal-ligand complex of formula (I). Where the invention compound contains two or more substituents $R^S$, each $R^S$ independently is bonded to a same or different substituted chemical group. When two or more $R^S$ are bonded to a same chemical group, they independently are bonded to a same or different carbon atom or heteroatom, as the case may be, in the same chemical group up to and including persubstitution of the chemical group.

The term "persubstitution" means each hydrogen atom (H) bonded to a carbon atom or heteroatom of a corresponding unsubstituted compound or functional group, as the case may be, is replaced by a substituent (e.g., $R^S$). The term "polysubstitution" means each of at least two, but not all, hydrogen atoms (H) bonded to carbon atoms or heteroatoms of a corresponding unsubstituted compound or functional group, as the case may be, is replaced by a substituent (e.g., $R^S$). The $(C_1-C_{18})$alkylene and $(C_1-C_8)$alkylene substituents are especially useful for forming substituted chemical groups that are bicyclic or tricyclic analogs, as the case may be, of corresponding monocyclic or bicyclic unsubstituted chemical groups.

As used herein, the term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and poly-cyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

Preferably, a $(C_1-C_{40})$hydrocarbyl independently is an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. More preferably, each of the aforementioned $(C_1-C_{40})$hydrocarbyl groups independently has a maximum of 20 carbon atoms (i.e., $(C_1-C_{20})$hydrocarbyl), and still more preferably a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $(C_{45})$alkyl. The $(C_{45})$alkyl is, for example, a $(C_{27}-C_{40})$alkyl substituted by one $R^S$, which is a $(C_{18}-C_5)$alkyl, respectively. Preferably, each $(C_1-C_5)$alkyl independently is methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl; unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_6-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_3-C_{12})$alkyl)) are defined in an analogous manner Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene are unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are a same carbon atom (e.g., —$CH_2$—) or on adjacent carbon atoms (i.e., 1,2-diradicals), or are spaced apart by one, two, or more intervening carbon atoms (e.g., respective 1,3-diradicals, 1,4-diradicals, etc.). Preferred is a 1,2-, 1,3-, 1,4-, or an alpha,omega-diradical, and more preferably a 1,2-diradical. The alpha, omega-diradical is a diradical that has maximum carbon backbone spacing between the radical carbons. More preferred is a 1,2-diradical, 1,3-diradical, or 1,4-diradical version of ($C_6$-$C_{18}$)arylene, ($C_3$-$C_{20}$)cycloalkylene, or ($C_2$-$C_{20}$)alkylene.

The term "($C_1$-$C_{40}$)alkylene" means a saturated straight chain or branched chain diradical (i.e., the radicals are not on ring atoms) of from 1 to 40 carbon atoms that is unsubstituted or substituted by one or more $R^S$-, —$(CH_2)_3$—, —$CH_2\dot{c}HCH_3$, —$(CH_2)_4$—, —$(CH_2)_5$—, —$(CH_2)_6$—, —$(CH_2)_7$—, —$(CH_2)_8$—, and —$(CH_2)$ Examples of unsubstituted ($C_1$-$C_{40}$)alkylene are unsubstituted ($C_1$-$C_{20}$)alkylene, including unsubstituted 1,2-($C_2$-$C_{10}$)alkylene; 1,3-($C_3$-$C_{10}$)alkylene; 1,4-($C_4$-$C_{10}$)alkylene; —$CH_2$—, —$CH_2CH_24C(H)(CH_3)$—. Examples of substituted ($C_1$-$C_{40}$)alkylene are substituted ($C_1$-$C_{20}$)alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a ($C_1$-$C_{18}$)alkylene, examples of substituted ($C_1$-$C_{40}$)alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "($C_3$-$C_{40}$)cycloalkylene" means a cyclic diradical (i.e., the radicals are on ring atoms) of from 3 to 40 carbon atoms that is unsubstituted or substituted by one or more $R^S$. Examples of unsubstituted ($C_3$-$C_{40}$)cycloalkylene are 1,3-cyclopropylene, 1,1-cyclopropylene, and 1,2-cyclohexylene. Examples of substituted ($C_3$-$C_{40}$)cycloalkylene are 2-oxo-1,3-cyclopropylene and 1,2-dimethyl-1,2-cyclohexylene.

The term "($C_1$-$C_{40}$)heterohydrocarbyl" means a heterohydrocarbon radical of from 1 to 40 carbon atoms and the term "($C_1$-$C_{40}$)heterohydrocarbylene means a heterohydrocarbon diradical of from 1 to 40 carbon atoms, and each heterohydrocarbon independently has one or more heteroatoms O; S; S(O); $S(O)_2$; $Si(R^C)_2$; $Ge(R^C)_2$; $P(R^P)$; and $N(R^N)$, wherein independently each $R^C$ is unsubstituted ($C_1$-$C_{18}$)hydrocarbyl, each $R^P$ is unsubstituted ($C_1$-$C_{18}$)hydrocarbyl; and each $R^N$ is unsubstituted ($C_1$-$C_{18}$)hydrocarbyl or absent (e.g., absent when N comprises —N= or tri-carbon substituted N). The heterohydrocarbon radical and each of the heterohydrocarbon diradicals independently is on a carbon atom or heteroatom thereof, although preferably is on a carbon atom when bonded to a heteroatom in formula (I) or to a heteroatom of another heterohydrocarbyl or heterohydrocarbylene. Each ($C_1$-$C_{40}$)heterohydrocarbyl and ($C_1$-$C_{40}$)heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

Preferably, the ($C_1$-$C_{40}$)heterohydrocarbyl independently is unsubstituted or substituted ($C_1$-$C_{40}$)heteroalkyl, ($C_1$-$C_{40}$)hydrocarbyl-O—, ($C_1$-$C_{40}$)hydrocarbyl-S—, ($C_1$-$C_{40}$)hydrocarbyl-S(O)—, ($C_1$-$C_{40}$)hydrocarbyl-$S(O)_2$—, ($C_1$-$C_{40}$)hydrocarbyl-$SnR^C)_2$—, ($C_1$-$C_{40}$)hydrocarbyl-$Ge(R^C)_2$—, ($C_1$-$C_{40}$)hydrocarbyl-$N(R^N)$—, ($C_1$-$C_{40}$)hydrocarbyl-P($R^P$)—, ($C_2$-$C_{40}$)heterocycloalkyl, ($C_2$-$C_{19}$)heterocycloalkyl-($C_1$-$C_{20}$)alkylene, ($C_3$-$C_{20}$)cycloalkyl-($C_1$-$C_{19}$)heteroalkylene, ($C_2$-$C_{19}$)heterocycloalkyl-($C_1$-$C_{20}$)heteroalkylene, ($C_1$-$C_{40}$)heteroaryl, ($C_1$-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene. The term "($C_4$-$C_{40}$)heteroaryl" means an unsubstituted or substituted (by one or more $R^S$) mono-, bi- or tricyclic heteroaromatic hydrocarbon radical of from 1 to 40 total carbon atoms and from 1 to 4 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., ($C_4$-$C_{12}$)heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P, and preferably O, S, or N. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 4 or 5 carbon atoms and 2 or 1 heteroatoms, the heteroatoms being N or P, and preferably N. Examples of 6-membered ring heteroaromatic hydrocarbon radical are pyridine-2-yl; pyrimidin-2-yl; and pyrazin-2-yl. The bicyclic heteroaromatic hydrocarbon radical preferably is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical preferably is a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

In some embodiments the ($C_4$-$C_{40}$)heteroaryl is 2,7-disubstituted carbazolyl or 3,6-disubstituted carbazolyl, more preferably wherein each $R^S$ independently is phenyl, methyl, ethyl, isopropyl, or tertiary-butyl, still more preferably 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

The aforementioned heteroalkyl and heteroalkylene groups are saturated straight or branched chain radicals or diradicals, respectively, containing ($C_1$-$C_{40}$) carbon atoms, or fewer carbon atoms as the case may be, and one or more of the heteroatoms $Si(R^C)_2$, $Ge(R^C)_2$, $P(R^P)$, $N(R^N)$, N, O, S, S(O), and $S(O)_2$ as defined above, wherein each of the heteroalkyl and heteroalkylene groups independently are unsubstituted or substituted by one or more $R^S$.

Examples of unsubstituted ($C_2$-$C_{40}$)heterocycloalkyl are unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" means fluorine atom (F), chlorine atom (Cl), bromine atom (Br), or iodine atom (I) radical. Preferably each halogen atom independently is the Br, F, or Cl radical, and more preferably the F or Cl radical. The term "halide" means fluoride ($F^-$), chloride ($Cl^-$), bromide ($Br^-$), or iodide ($I^-$) anion.

Unless otherwise indicated herein the term "heteroatom" means O, S, S(O), $S(O)_2$, $Si(R^C)_2$, $Ge(R^C)_2$, $P(R^P)$, or N($R^N$), wherein independently each $R^C$ is unsubstituted ($C_1$-$C_{18}$)hydrocarbyl, each $R^P$ is unsubstituted ($C_1$-$C_{18}$)hydrocarbyl; and each $R^N$ is unsubstituted ($C_1$-$C_{18}$)hydrocarbyl or absent (absent when N comprises —N═). Preferably there is no germanium (Ge) atom in the invention compound or complex.

Preferably, there are no O—O, S—S, or O—S bonds, other than O—S bonds in an S(O) or S(O)$_2$ diradical functional group, in the metal-ligand complex of formula (I). More preferably, there are no O—O, N—N, P—P, N—P, S—S, or O—S bonds, other than O—S bonds in an S(O) or S(O)$_2$ diradical functional group, in the metal-ligand complex of formula (I).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero)aromatic rings, if any.

M is titanium, zirconium, or hafnium. In one embodiment, M is zirconium or hafnium, and in another embodiment M is hafnium. In some embodiments, M is in a formal oxidation state of +2, +3, or +4. In some embodiments, n is 0, 1, 2, or 3. Each X independently is a monodentate ligand that is neutral, monoanionic, or dianionic; or two Xs are taken together to form a bidentate ligand that is neutral, monoanionic, or dianionic. X and n are chosen in such a way that the metal-ligand complex of formula (I) is, overall, neutral. In some embodiments each X independently is the monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, ($C_1$-$C_{40}$)hydrocarbyl carbanion, ($C_1$-$C_{40}$)heterohydrocarbyl carbanion, halide, nitrate, carbonate, phosphate, sulfate, HC(O)O$^-$, ($C_1$-$C_{40}$)hydrocarbylC(O)O$^-$, HC(O)N(H)$^-$, ($C_1$-$C_{40}$)hydrocarbylC(O)N(H)$^-$, ($C_1$-$C_{40}$)hydrocarbylC(O)N(($C_1$-$C_{20}$)hydrocarbyl)$^-$, $R^K R^L B^-$, $R^K R^L N^-$, $R^K O^-$, $R^K S^-$, $R^K R^L P^-$, or $R^M R^K R^L Si^-$, wherein each $R^K$, $R^L$, and $R^M$ independently is hydrogen, ($C_1$-$C_{40}$)hydrocarbyl, or ($C_1$-$C_{40}$)heterohydrocarbyl, or $R^K$ and $R^L$ are taken together to form a ($C_2$-$C_{40}$)hydrocarbylene or ($C_1$-$C_{40}$)heterohydrocarbylene and $R^M$ is as defined above.

In some embodiments at least one monodentate ligand of X independently is the neutral ligand. In one embodiment, the neutral ligand is a neutral Lewis base group that is $R^X NR^K R^L$, $R^K OR^L$, $R^K SR^L$, or $R^X PR^K R^L$, wherein each $R^X$ independently is hydrogen, ($C_1$-$C_{40}$)hydrocarbyl, [($C_1$-$C_{10}$)hydrocarbyl]$_3$Si, [($C_1$-$C_{10}$)hydrocarbyl]$_3$Si($C_1$-$C_{10}$)hydrocarbyl, or ($C_1$-$C_{40}$)heterohydrocarbyl and each $R^K$ and $R^L$ independently is as defined above.

In some embodiments, each X is a monodentate ligand that independently is a halogen atom, unsubstituted ($C_1$-$C_{20}$)hydrocarbyl, unsubstituted ($C_1$-$C_{20}$)hydrocarbylC(O)O—, or $R^K R^L N$— wherein each of $R^K$ and $R^L$ independently is an unsubstituted ($C_1$-$C_{20}$)hydrocarbyl. In some embodiments each monodentate ligand X is a chlorine atom, ($C_1$-$C_{10}$)hydrocarbyl (e.g., ($C_1$-$C_6$)alkyl or benzyl), unsubstituted ($C_1$-$C_{10}$)hydrocarbylC(O)O—, or $R_K R^L N$— wherein each of $R^K$ and $R^L$ independently is an unsubstituted ($C_1$-$C_{10}$) hydrocarbyl.

In some embodiments there are at least two X and the two X are taken together to form the bidentate ligand. In some embodiments the bidentate ligand is a neutral bidentate ligand. In one embodiment, the neutral bidentate ligand is a diene of formula ($R^D$)$_2$C═C($R^D$)—C($R^D$)═C($R^D$)$_2$, wherein each $R^D$ independently is H, unsubstituted ($C_1$-$C_6$) alkyl, phenyl, or naphthyl. In some embodiments the bidentate ligand is a monoanionic-mono(Lewis base) ligand. The monoanionic-mono(Lewis base) ligand may be a 1,3-dionate of formula (D): $R^E$—C(O$^-$)═CH—C(═O)—$R^E$ (D), wherein each $R^D$ independently is H, unsubstituted ($C_1$-$C_6$) alkyl, phenyl, or naphthyl. In some embodiments the bidentate ligand is a dianionic ligand. The dianionic ligand has a net formal oxidation state of −2. In one embodiment, each dianionic ligand independently is carbonate, oxalate (i.e., $^-$O$_2$CC(O)O$^-$), ($C_2$-$C_{40}$)hydrocarbylene dicarbanion, ($C_1$-$C_{40}$)heterohydrocarbylene dicarbanion, phosphate, or sulfate.

As previously mentioned, number and charge (neutral, monoanionic, dianionic) of X are selected depending on the formal oxidation state of M such that the metal-ligand complex of formula (I) is, overall, neutral.

In some embodiments each X is the same, wherein each X is methyl; ethyl; 1-propyl; 2-propyl; 1-butyl; 2,2,-dimethylpropyl; trimethylsilylmethyl; phenyl; benzyl; or chloro. In some embodiments n is 2 and each X is the same.

In some embodiments at least two X are different. In some embodiments n is 2 and each X is a different one of methyl; ethyl; 1-propyl; 2-propyl; 1-butyl; 2,2,-dimethylpropyl; trimethylsilylmethyl; phenyl; benzyl; and chloro.

The integer n indicates number of X. In one embodiment, n is 2 or 3 and at least two X independently are monoanionic monodentate ligands and a third X, if present, is a neutral monodentate ligand. In some embodiments n is 2 at two X are taken together to form a bidentate ligand. In some embodiments, the bidentate ligand is 2,2-dimethyl-2-silapropane-1,3-diyl or 1,3-butadiene.

In some embodiments, each Z independently is O, S, N($C_1$-$C_{40}$)hydrocarbyl, or P($C_1$-$C_{40}$)hydrocarbyl. In some embodiments each Z is different. In some embodiments one Z is O and one Z is NCH$_3$. In some embodiments one Z is O and one Z is S. In some embodiments one Z is S and one Z is N($C_1$-$C_{40}$)hydrocarbyl (e.g., NCH$_3$). In some embodiments each Z is the same. In some embodiments each Z is O. In some embodiments each Z is S. In some embodiments each Z is N($C_1$-$C_{40}$)hydrocarbyl (e.g., NCH$_3$). In some embodiments at least one, and in some embodiments each Z is P($C_1$-$C_{40}$)hydrocarbyl (e.g., PCH$_3$).

In some embodiments, L is ($C_3$-$C_{40}$)hydrocarbylene or (3 to 40 atom, wherein such atom is not H) heterohydrocarbylene, wherein the ($C_3$-$C_{40}$)hydrocarbylene has a portion that comprises a 3-carbon atom to 10-carbon atom linker backbone linking the Z atoms in formula (I) (to which L is bonded) and the (3 to 40 atom, wherein such atom is not H) heterohydrocarbylene has a portion that comprises a 3-atom to 10-atom linker backbone linking the Z atoms in formula (I), wherein each of the from 3 to 10 atoms of the 3-atom to 10-atom linker backbone of the (3 to 40 atom, wherein such atom is not H) heterohydrocarbylene independently is a carbon atom or heteroatom, wherein each heteroatom independently is C($R^C$)$_2$, O, S, S(O), S(O)$_2$, Si($R^C$)$_2$, Ge($R^C$)$_2$, P($R^P$), or N($R^N$), wherein independently each $R^C$ is ($C_1$-$C_{30}$)hydrocarbyl, each $R^P$ is ($C_1$-$C_{30}$)hydrocarbyl; and each $R^N$ is ($C_1$-$C_{30}$)hydrocarbyl or absent. In some embodiments L is the $(C_3-C_{40})$hydrocarbylene. Preferably the aforementioned portion that comprises a 3-carbon atom to 10-carbon atom linker backbone of the $(C_3-C_{40})$hydrocarbylene of L comprises a 3-carbon atom to 10-carbon atom, and more preferably a 3-carbon atom or 4-carbon atom linker backbone linking the Z atoms in formula (I) to which L is bonded. In some embodiments L comprises the 3-carbon atom linker backbone (e.g., L is —CH$_2$CH$_2$CH$_2$—; —CH(CH$_3$)CH$_2$CH(CH$_3$)—; —CH(CH$_3$)CH(CH$_3$)CH(CH$_3$)—; —CH$_2$C(CH$_3$)$_2$CH$_2$—); 1,3-cyclopentane-diyl; or 1,3-cyclohexane-diyl. In some embodiments L comprises the 4-carbon atom linker backbone (e.g., L is —CH$_2$CH$_2$CH$_2$CH$_2$—; —CH$_2$C(CH$_3$)$_2$C(CH$_3$)$_2$CH$_2$—; 1,2-bis(methylene)cyclohexane; or 2,3-bis(methylene)-bicyclo[2.2.2]octane). In some embodiments L comprises the 5-carbon atom linker backbone (e.g., L is —CH$_2$CH$_2$CH$_2$CH$_2$CH$_2$— or 1,3-bis(methylene)cyclohexane). In some embodiments L comprises the 6-carbon atom linker backbone (e.g., L is —CH$_2$CH$_2$CH$_2$CH$_2$CH$_2$CH$_2$— or 1,2-bis(ethylene)cyclohexane).

In some embodiments, L is the $(C_3-C_{40})$hydrocarbylene and the $(C_3-C_{40})$hydrocarbylene of L is a $(C_3-C_{12})$hydrocarbylene, and more preferably $(C_3-C_8)$hydrocarbylene. In some embodiments the $(C_3-C_{40})$hydrocarbylene is an unsubstituted $(C_3-C_{40})$alkylene. In some embodiments the $(C_3-C_{40})$hydrocarbylene is a substituted $(C_3-C_{40})$alkylene. In some embodiments the $(C_3-C_{40})$hydrocarbylene is an unsubstituted $(C_3-C_{40})$cycloalkylene or substituted $(C_3-C_{40})$cycloalkylene, wherein each substituent independently is R$^S$, wherein preferably the R$^S$ independently is $(C_1-C_4)$alkyl.

In some embodiments L is the unsubstituted $(C_3-C_{40})$alkylene, and in some other embodiments, L is an acyclic unsubstituted $(C_3-C_{40})$alkylene, and still more preferably the acyclic unsubstituted $(C_2-C_{40})$alkylene is, —CH$_2$CH$_2$CH$_2$—, cis —CH(CH$_3$)CH$_2$CH(CH$_3$)—, trans —CH(CH$_3$)CH$_2$CH(CH$_3$)—, —CH(CH$_3$)CH$_2$CH(CH$_3$)$_2$—, —CH(CH$_3$)CH(CH$_3$)CH(CH$_3$)—, —CH$_2$C(CH$_3$)$_2$CH$_2$—, —CH$_2$CH$_2$CH$_2$CH$_2$—, or —CH$_2$C(CH$_3$)$_2$C(CH$_3$)$_2$CH$_2$—. In some embodiments L is trans-1,2-bis(methylene)cyclopentane, cis-1,2-bis(methylene)cyclopentane, trans-1,2-bis(methylene)cyclohexane, or cis-1,2-bis(methylene)cyclohexane. In some embodiments the $(C_1-C_{40})$alkylene-substituted $(C_1-C_{40})$alkylene is exo-2,3-bis(methylene)bicyclo[2.2.2]octane or exo-2,3-bis(methylene)-7,7-dimethyl-bicyclo[2.2.1]heptane. In some embodiments L is the unsubstituted $(C_3-C_{40})$cycloalkylene, and in some other embodiments, L is cis-1,3-cyclopentane-diyl or cis-1,3-cyclohexane-diyl. In some embodiments L is the substituted $(C_3-C_{40})$cycloalkylene, and more preferably L is a $(C_1-C_{40})$alkylene-substituted $(C_3-C_{40})$cycloalkylene, and in some other embodiments, L is the $(C_1-C_{40})$alkylene-substituted $(C_3-C_{40})$cycloalkylene that is exo-bicyclo[2.2.2]octan-2,3-diyl.

In some embodiments L is the (3 to 40 atoms)heterohydrocarbylene. In some embodiments, the aforementioned portion that comprises a 3-atom to 6-atom linker backbone of the (3 to 40 atoms)heterohydrocarbylene of L comprises a from 3-atom to 5-atom, and in some other embodiments a 3-atom or 4-atom linker backbone linking the Z atoms in formula (I) to which L is bonded. In some embodiments L comprises the 3-atom linker backbone (e.g., L is —CH$_2$CH$_2$CH(OCH$_3$)—, —CH$_2$Si(CH$_3$)$_2$CH$_2$—, or —CH$_2$Ge(CH$_3$)$_2$CH$_2$—). The "—CH$_2$Si(CH$_3$)$_2$CH$_2$—" may be referred to herein as a 1,3-diradical of 2,2-dimethyl-2-silapropane. In some embodiments L comprises the 4-atom linker backbone (e.g., L is —CH$_2$CH$_2$OCH$_2$— or —CH$_2$P(CH$_3$)CH$_2$CH$_2$—). In some embodiments L comprises the 5-atom linker backbone (e.g., L is —CH$_2$CH$_2$OCH$_2$CH$_2$— or —CH$_2$CH$_2$N(CH$_3$)CH$_2$CH$_2$—). In some embodiments L comprises the 6-atom linker backbone (e.g., L is —CH$_2$CH$_2$C(OCH$_3$)$_2$CH$_2$CH$_2$—, —CH$_2$CH$_2$CH$_2$S(O)$_2$CH$_2$CH$_2$—, or —CH$_2$CH$_2$S(O)CH$_2$CH$_2$CH$_2$—). In some embodiments each of the from 3 to 6 atoms of the 3-atom to 6-atom linker backbone is a carbon atom. In some embodiments at least one heteroatom is the C(R$^C$)$_2$. In some embodiments at least one heteroatom is the Si(R$^C$)$_2$. In some embodiments at least one heteroatom is the O. In some embodiments at least one heteroatom is the N(R$^N$). In some embodiments, there are no O—O, S—S, or O—S bonds, other than O—S bonds in the S(O) or S(O)$_2$ diradical functional group, in —Z-L-Z—. In some other embodiments, there are no O—O, N—N, P—P, N—P, S—S, or O—S bonds, other than O—S bonds in an S(O) or S(O)$_2$ diradical functional group, in —Z-L-Z—. In some embodiments, the (3 to 40 atoms)heterohydrocarbylene is (3 to 11 atoms, excluding H)heterohydrocarbylene, and in some other embodiments (3 to 7 atoms)heterohydrocarbylene. In some embodiments the (3 to 7 atoms)heterohydrocarbylene of L is —CH$_2$Si(CH$_3$)$_2$CH$_2$—; —CH$_2$CH$_2$Si(CH$_3$)$_2$CH$_2$—; or CH$_2$Si(CH$_3$)$_2$CH$_2$CH$_2$—. In some embodiments, the (C$_1$-C$_7$)heterohydrocarbylene of L is —CH$_2$Si(CH$_3$)$_2$CH$_2$—, —CH$_2$Si(CH$_2$CH$_3$)$_2$CH$_2$—, —CH$_2$Si(isopropyl)$_2$CH$_2$—, —CH$_2$Si(tetra methylene)CH$_2$—, or —CH$_2$Si(pentamethylene)CH$_2$—. The —CH$_2$Si(tetramethylene)CH$_2$— is named 1-silacyclopentan-1,1-dimethylene. The —CH$_2$Si(pentamethylene)CH$_2$— is named 1-silacyclohexan-1,1-dimethylene.

In other embodiments, the catalyst may comprise a metal complex of a polyvalent aryloxyether corresponding to the formula:

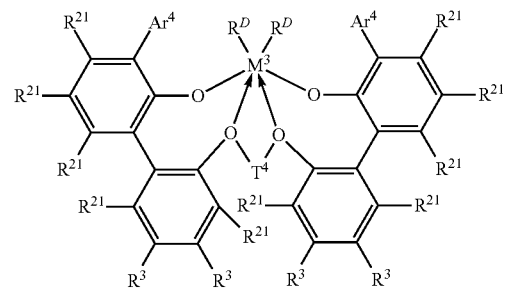

wherein M$^3$ is Ti, Hf or Zr, and in some embodiments, M$^3$ is Zr;

Ar$^4$ is independently in each occurrence a substituted C$_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

T$^4$ is independently in each occurrence a C$_{2-20}$ alkylene, cycloalkylene or cycloalkenylene group, or an inertly substituted derivative thereof;

R$^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

R$^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two R$^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

In other embodiments, the ethylene/α-olefin interpolymer composition is prepared via a process comprising: (a) polymerizing ethylene and one or more α-olefins in the presence of a first catalyst to form a semi-crystalline polymer in a first reactor or a first part of a multi-part reactor; and (b) reacting freshly supplied ethylene and one or more α-olefins in the presence of a second catalyst comprising an organometallic catalyst thereby forming an ethylene/α-olefin interpolymer composition in at least one other reactor or a later part of a multi-part reactor, wherein at least one of the catalyst systems in step (a) or (b) comprises a metal complex of a polyvalent aryloxyether as previously described above.

In some embodiments herein, the ethylene/α-olefin interpolymer composition may be produced via a solution polymerization according to the following exemplary process: all raw materials (e.g., ethylene and 1-octene) and the process solvent (a narrow boiling range high-purity isoparaffinic solvent, such as, for example, solvents commercially available under the tradename Isopar E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, approximate to 750 psig. The solvent and comonomer (e.g., 1-octene) feed is pressurized via mechanical positive displacement pump to a pressure that is above the reaction pressure, approximately 750 psig. The individual catalyst components are manually batch diluted to specified component concentrations with purified solvent (e.g., Isopar E) and pressurized to a pressure that is above the reaction pressure, approximately 750 psig. All reaction feed flows are measured with mass flow meters, independently controlled with computer automated valve control systems.

The continuous solution polymerization reactor system may consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically 40° C. by passing the feed stream through a heat exchanger. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two co-catalyst components are fed based on calculated specified molar ratios to the primary catalyst component. Immediately following each fresh injection location (either feed or catalyst), the feed streams are mixed with the circulating polymerization reactor contents with static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor, it is contacted with a deactivating agent, e.g. water, to stop the reaction. In addition, various additives, such as, for example, antioxidants, can be added at this point. The stream then goes through another set of static mixing elements to evenly disperse the catalyst deactivating agent and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper.

In some embodiments, the ethylene/α-olefin interpolymer composition may have a comonomer distribution profile, as measured by Crystallization Elution Fractionation (CEF), present with one or more peaks in the temperature range from 35° C. to 120° C.

The ethylene/α-olefin interpolymer composition described herein may comprise a first homogeneously branched random ethylene/α-olefin copolymer and a second homogeneously branched random ethylene/α-olefin copolymer. As used herein, "copolymer" means a polymer prepared by the polymerization of at least two different types of monomers. "Random copolymer" means a copolymer wherein the at least two different monomers are arranged in a non-uniform order. The term "random copolymer" specifically excludes block copolymers. The term "homogeneous ethylene polymer" as used to describe ethylene polymers is used in the conventional sense in accordance with the original disclosure by Elston in U.S. Pat. No. 3,645,992, the disclosure of which is incorporated herein by reference, to refer to an ethylene polymer in which the comonomer is randomly distributed within a given polymer molecule and wherein substantially all of the polymer molecules have substantially the same ethylene to comonomer molar ratio. As defined herein, both substantially linear ethylene polymers and homogeneously branched linear ethylene are homogeneous ethylene polymers.

Accordingly, in some embodiments, the first homogeneously branched random ethylene/α-olefin copolymer may have a density from 0.860 g/cc to 0.925 g/cc. All individual values and subranges of 0.860 g/cc to 0.925 g/cc are included and disclosed herein. For example, in some embodiments, the first homogeneously branched random ethylene/α-olefin copolymer may have a density from 0.870 g/cc to 0.920 g/cc, 0.875 g/cc to 0.915 g/cc, 0.880 g/cc to 0.915 g/cc, 0.885 g/cc to 0.915 g/cc, 0.890 g/cc to 0.915 g/cc, 0.890 g/cc to 0.912 g/cc, 0.890 g/cc to 0.910 g/cc, or from 0.890 g/cc to 0.905 g/cc.

In embodiments herein, the first homogeneously branched random ethylene/α-olefin copolymer may have a density that is lower than the second homogeneously branched random ethylene/α-olefin copolymer. For example, in some embodiments, the first homogeneously branched random ethylene/α-olefin copolymer may have a density that is at least 0.005 g/cc, 0.010 g/cc, 0.015 g/cc, 0.020 g/cc, 0.025 g/cc, 0.030 g/cc, 0.035 g/cc, or 0.040 g/cc lower than the second homogeneously branched random ethylene/α-olefin copolymer. In other embodiments, the first homogeneously branched random ethylene/α-olefin copolymer may have a density that is from 0.005 g/cc to 0.040 g/cc, 0.010 g/cc to 0.040 g/cc, 0.010 g/cc to 0.035 g/cc, 0.010 g/cc to 0.030 g/cc, 0.010 g/cc to 0.025 g/cc, 0.015 g/cc to 0.040 g/cc, 0.020 g/cc to 0.040 g/cc, or 0.025 g/cc to 0.040 g/cc lower than the second homogeneously branched random ethylene/α-olefin copolymer.

In embodiments herein, the first homogeneously branched random ethylene/α-olefin copolymer may have a melt index, I2, of from 0.2 g/10 min to 25 g/10 min. All individual values and subranges of 0.2 g/10 min to 25 g/10 min are included and disclosed herein. For example, in some embodiments, the first homogeneously branched random ethylene/α-olefin copolymer may have a melt index, I2, of from 1 g/10 min to 25 g/10 min, from 1 g/10 min to 20 g/10 min, from 1 g/10 min to 15 g/10 min, from 2 g/10 min to 15 g/10 min, from 3 g/10 min to 15 g/10 min, from 3 g/10 min to 12 g/10 min, or from 3 g/10 min to 10 g/10 min.

In embodiments herein, the first homogeneously branched random ethylene/α-olefin copolymer may have a density from 0.860 g/cc to 0.925 g/cc and/or a melt index, I2, of from 0.2 g/10 min to 25 g/10 min. All individual values and subranges of a density from 0.860 g/cc to 0.925 g/cc and/or a melt index of from 0.2 g/10 min to 25 g/10 min are included and disclosed herein as previously outlined herein.

Additionally, the ethylene/α-olefin interpolymer composition may comprise about 10 to about 90% by weight, about 20 to about 80% by weight, about 25 to about 70% by weight, about 30 to about 65% by weight, about 30 to 60% by weight, about 30 to about 55% by weight, about 30 to about 50% by weight, or about 30 to about 48% by weight of the first homogeneously branched random ethylene/α-olefin copolymer. Similarly, the ethylene/α-olefin interpolymer composition may comprise about 10 to about 90% by weight, about 20 to about 80% by weight, about 30 to about 70% by weight, about 35 to about 70% by weight, about 40 to about 70% by weight, about 50 to about 70% by weight, or about 52 to about 70% by weight of the second homogeneously branched random ethylene/α-olefin copolymer. In a specific embodiment, the ethylene/α-olefin interpolymer composition may comprise about 35% to about 45% by weight of the first homogeneously branched random ethylene/α-olefin copolymer, and about 55% to about 65% of the second homogeneously branched random ethylene/α-olefin copolymer.

In embodiments herein, the ethylene/α-olefin interpolymer composition is characterized by having a Comonomer Distribution Constant in the range of from 25 to 100. All individual values and subranges of from 25 to 100 are included and disclosed herein. For example, in some embodiments, the ethylene/α-olefin interpolymer composition is characterized by having a Comonomer Distribution Constant in the range of from 25 to 95, 25 to 90, 25 to 85, 30 to 85, or 30 to 80.

In embodiments herein, the ethylene/α-olefin interpolymer composition is characterized by having a zero shear viscosity ratio (ZSVR) in the range of from 1.40 to 2.10. All individual values and subranges of 1.40 to 2.10 are included and disclosed herein. For example, in some embodiments, the ethylene/α-olefin interpolymer composition is characterized by having a ZSVR in the range of from 1.40 to 2.00, 1.40 to 1.95, 1.40 to 1.90, 1.40 to 1.85, 1.40 to 1.80, or 1.40 to 1.75.

In embodiments herein, the ethylene/α-olefin interpolymer composition may have a vinyl unsaturation of less than 100 vinyls per 1,000,000 carbon atoms present in the backbone of the ethylene/α-olefin interpolymer composition. All individual values and subranges of less than 100 vinyls per 1,000,000 carbon atoms present in the backbone of the ethylene/α-olefin interpolymer composition are included and disclosed herein. For example, in some embodiments, the ethylene/α-olefin interpolymer composition may have a vinyl unsaturation of less than 95, 90, 85, 80, 75, 70, 65, 60, 55, 50, or 45 vinyls per 1,000,000 carbon atoms present in the backbone of the ethylene/α-olefin interpolymer composition.

In embodiments herein, the ethylene/α-olefin interpolymer composition may have less than 220 total unsaturation unit/1,000,000 carbon atoms present in the backbone of the ethylene/α-olefin interpolymer composition. All individual values and subranges of less than 220 total unsaturation unit/1,000,000 carbon atoms present in the backbone of the ethylene/α-olefin interpolymer composition are included and disclosed herein. For example, in some embodiments, the ethylene/α-olefin interpolymer composition may have less than 210, 200, 175, 150, 125, 115, 110, 100, 95, 90, 85, 80, 75, or 70 total unsaturation unit/1,000,000 carbon atoms present in the backbone of the ethylene/α-olefin interpolymer composition.

The ethylene/α-olefin interpolymer composition may be characterized by having a highest Differential Scanning Calorimetry (DSC) temperature melting peak below a temperature of 120.0° C. In embodiments herein, the ethylene/α-olefin interpolymer composition may have a highest DSC temperature melting peak that can range from a lower limit of 90.0° C., 95.0° C., 97.5° C., 98.0° C., 99.0° C., 100.0° C., 101.0° C., or 101.5.0° C. to an upper limit of 120.0° C., 118.0° C., 115.0° C., 112.5° C., 110.0° C., 109.0° C., or 108.0° C. In other embodiments, the ethylene/α-olefin interpolymer composition may have a highest DSC temperature melting peak in the range of from 90.0° C. to 115.0° C., from 90.0° C. to 113.0° C.; 90.0° C. to 112.0° C., from 90.0° C. to 111.0° C., from 90.0° C. to 110.0° C., or from 90.0° C. to 108.0° C. In further embodiments, the ethylene/α-olefin interpolymer composition may have a highest DSC temperature melting peak in the range of from 95.0° C. to 115.0° C., from 95.0° C. to 113.0° C.; 95.0° C. to 112.0° C., from 95.0° C. to 111.0° C., from 95.0° C. to 110.0° C., from 95.0° C. to 108.0° C., from 100.0° C. to 120.0° C., from 100.0° C. to 118.0° C., from 100.0° C. to 115.0° C., 100.0° C. to 113.0° C.; 100.0° C. to 112.0° C., from 100.0° C. to 111.0° C., from 100.0° C. to 110.0° C., or from 100.0° C. to 108.0° C.

In embodiments herein, the ethylene/α-olefin interpolymer composition may be characterized by having a highest DSC temperature crystallization peak of from 75.0 to 95.0°

C. For example, in some embodiments, the ethylene/α-olefin interpolymer composition may be characterized by having a highest DSC temperature crystallization peak of from 77.5 to 95.0° C., from 80.0 to 95.0° C., from 80.0 to 92.5° C., from 80.0 to 90.0° C., or from 80.0 to 87.5° C.

In embodiments herein, the ethylene/α-olefin interpolymer composition may be characterized by having a difference between the highest DSC temperature melting peak, Tm, and highest DSC temperature crystallization peak, Tc, of greater than 19.0° C. For example, in some embodiments, the ethylene/α-olefin interpolymer composition may have a difference between the highest DSC temperature melting peak, Tm, and highest DSC temperature crystallization peak, Tc, of from 20.0° C. to 30.0° C., 20.0° C. to 28.0° C., 20.0° C. to 25.0° C., 20.0° C. to 24.0° C., or 20.0° C. to 23.0° C. In other embodiments, the ethylene/α-olefin interpolymer composition may have a difference between the highest DSC temperature melting peak, Tm, and highest DSC temperature crystallization peak, Tc, of from 19.0° C. to 30.0° C., 19.0° C. to 28.0° C., 19.0° C. to 27.5° C., 19.0° C. to 25.0° C., 19.0° C. to 24.0° C., or 19.0° C. to 23.0° C.

In embodiments herein, the ethylene/α-olefin interpolymer composition has a density in the range of 0.860 to 0.925 g/cc. All individual values and subranges of 0.860 to 0.925 g/cc are included and disclosed herein. For example, in some embodiments, the ethylene/α-olefin interpolymer composition may have a density that can range from a lower limit of 0.860, 0.865, 0.870, 0.875, 0.880, 0.885, 0.890, 0.895, 0.900, 0.903, 0.905, 0.908, 0.910, or 0.912 g/cc to an upper limit of 0.925, 0.922, 0.920, 0.918, 0.915, 0.912, 0.911, or 0.910 g/cc. In one or more specific embodiments, the ethylene/α-olefin interpolymer composition may have a density of 0.895 to 0.925 g/cc, 0.900 to 0.925 g/cc, 0.900 to 0.920 g/cc, 0.900 to 0.915 g/cc, 0.900 to 0.912 g/cc, 0.900 to 0.911 g/cc, or 0.900 to 0.910 g/cc. In further specific embodiments, the ethylene/α-olefin interpolymer composition may have a density of 0.875 to 0.925 g/cc, 0.890 to 0.925 g/cc, 0.900 to 0.925 g/cc, 0.903 to 0.925 g/cc, or 0.905 to 0.925 g/cc. Density may be measured in accordance with ASTM D792.

In embodiments herein, the ethylene/α-olefin interpolymer composition has a molecular weight distribution (Mw/Mn) in the range of from 2.0 to 4.5, where Mw is the weight average molecular weight and Mn is the number average molecular weight. All individual values and subranges of 2.0 to 4.5 are included and disclosed herein. For example, in some embodiments, the ethylene/α-olefin interpolymer composition may have a molecular weight distribution (Mw/Mn) that can be from a lower limit of 2.0, 2.1, or 2.2 to an upper limit of 4.3, 4.0, 3.7, 3.5, 3.3, 3.1, or 3.0. In other embodiments, the ethylene/α-olefin interpolymer composition may have a molecular weight distribution (Mw/Mn) that can be from 2.0 to 4.0, 2.0 to 3.7, 2.0 to 3.5, 2.0 to 3.3, 2.0 to 3.0, or 2.0 to 3.0. The Mw and Mn may be determined by high temperature gel permeation chromatography (HT-GPC) as outlined below.

In embodiments herein, the ethylene/α-olefin interpolymer composition has a melt index ($I_2$) in the range of 1 to 25 g/10 minutes. All individual values and subranges of 1 to 25 g/10 minutes are included and disclosed herein. For example, in some embodiments, the ethylene/α-olefin interpolymer composition may have a melt index ($I_2$) that can be from a lower limit of 2, 3, 4, or 5 g/10 minutes to an upper limit of 23, 22, 20, 18, 17, 16, or 15 g/10 minutes. In other embodiments, the ethylene/α-olefin interpolymer composition may have a melt index ($I_2$) of 1 to 22, 1 to 20, 1 to 18, 2 to 18, 2 to 16, 3 to 15, 4 to 15, or 5 to 15 g/10 minutes.

Melt index, $I_2$, may be measured in accordance with ASTM D1238 (190° C. and 2.16 kg).

In embodiments herein, the ethylene/α-olefin interpolymer composition may have a melt flow ratio ($I10/I2$) in the range of 1 to 15. All individual values and subranges of 1 to 15 are included and disclosed herein. For example, in some embodiments, the ethylene/α-olefin interpolymer composition may have a melt flow ratio ($I10/I2$) of from 1 to 13, 1 to 12, 1 to 10, 2 to 12, 2 to 10, 3 to 12, 3 to 10, 4 to 12, 4 to 10, 4 to 8, 5 to 12, 5 to 10, or 5 to 8. Melt index, $I10$, may be measured in accordance with ASTM D1238 (190° C. and 10.0 kg).

In embodiments herein, the ethylene/α-olefin interpolymer composition may have a weight average molecular weight (Mw) in the range of 25,000 to 250,000 daltons. All individual values and subranges of 25,000 to 250,000 daltons are included and disclosed herein. For example, in some embodiments, the ethylene/α-olefin interpolymer composition may have a $M_w$ that can be from a lower limit of 30,000; 35,000; 40,000; 45,000; or 50,000 daltons to an upper limit of 225,000; 210,000; 200,000; 190,000; 180,000; 175,000; 170,000; 165,000; 160,000; 155,000; 150,000; 145,000; 140,000; 125,000; 115,000; 110,000; 105,000; 100,000; 90,000; 80,000; or 70,000 daltons.

In embodiments herein, the ethylene/α-olefin interpolymer composition may have a long chain branching frequency in the range of from 0.02 to 3 long chain branches (LCB) per 1000 carbon atoms. All individual values and subranges of from 0.02 to 3 long chain branches (LCB) per 1000 carbon atoms are included and disclosed herein. For example, in some embodiments, the ethylene/α-olefin interpolymer composition may have a long chain branching frequency in the range of from 0.02 to 1 long chain branches/1000 carbons, or from 0.05 long chain branches/1000 carbons to 1 long chain branches/1000 carbons. In other embodiments, the ethylene/α-olefin interpolymer composition may have no long chain branching. Long chain branching frequency may be determined using conventional techniques known in the industry, such as, $C_{13}$ nuclear magnetic resonance spectroscopy, as discussed in Randall, Rev. Macromol. Chem. Phys., C29 (2&3), pp. 285-297, and in U.S. Pat. No. 5,292,845, the disclosures of which are incorporated herein by reference.

In embodiments herein, the ethylene/α-olefin interpolymer composition may comprise less than or equal to 100 parts by weight of metal complex residues remaining from a catalyst system comprising a metal complex of a polyvalent aryloxyether per one million parts of the ethylene/α-olefin interpolymer composition. All individual values and subranges of less than or equal to 100 parts by weight of metal complex residues remaining from a catalyst system are included and disclosed herein. For example, in some embodiments, the ethylene/α-olefin interpolymer composition may comprise less than 10 parts, less than 8 parts, less than 5 parts, less than 4 parts, less than 1 parts, less than 0.5 parts, or less than 0.1 parts, by weight of metal complex residues remaining from a catalyst system comprising a metal complex of a polyvalent aryloxyether per one million parts of the ethylene/α-olefin interpolymer composition. The metal complex residues remaining from the catalyst system comprising a metal complex of a polyvalent aryloxyether in the ethylene/α-olefin interpolymer composition may be measured by x-ray fluorescence (XRF), which is calibrated to reference standards. The polymer resin granules can be compression molded at elevated temperature into plaques having a thickness of about ⅜ of an inch for the x-ray measurement. At very low concentrations of metal complex residues, such as below 0.1 ppm, inductively coupled plasma atomic emission spectroscopy (ICP-AES) would be a suitable method to determine metal complex residues present in the ethylene/α-olefin interpolymer composition.

The ethylene/α-olefin interpolymer composition may also be characterized by its storage modulus. In embodiments herein, the ethylene/α-olefin interpolymer composition may have a ratio of storage modulus at 25° C., G'(25° C.) to storage modulus at 100° C., G'(100° C.) of less than 150. All individual values and subranges of less than 150 are included and disclosed herein. For example, in some embodiments, the ethylene/α-olefin interpolymer composition may have a ratio of storage modulus at 25° C., G'(25° C.) to storage modulus at 100° C., G'(100° C.) of less than 125, 100, 95, 90, 85, 80, 75, or 70. In other embodiments, the ethylene/α-olefin interpolymer composition may have a ratio of storage modulus at 25° C., G'(25° C.) to storage modulus at 100° C., G'(100° C.) of from 10 to 150, 10 to 125, 10 to 100, 15 to 100, 15 to 90, 15 to 85, 15 to 80, 15 to 75, 17 to 150, 17 to 125, 17 to 100, 17 to 90, 17 to 85, 17 to 80, 17 to 75, or 17 to 70.

The ethylene/α-olefin interpolymer composition may further comprise additional components such as one or more other polymers and/or one or more additives. Such additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. The ethylene-based polymer composition may contain from about 0.1 to about 10 percent by the combined weight of such additives, based on the weight of the ethylene-based polymer composition including such additives.

In embodiments herein, the plurality of random loops may be made from a blend of an ethylene/α-olefin interpolymer composition as described herein and at least one other polymer. The at least one other polymer can be a thermoplastic elastomer, a thermoplastic non-elastic polymer or a combination thereof (polymer blend). In certain embodiments, the plurality of random loops are formed from a composite fiber of an ethylene/α-olefin interpolymer and a thermoplastic elastomer, a composite fiber of an ethylene/α-olefin interpolymer and a thermoplastic non-elastomer, or a composite fiber of an ethylene/α-olefin interpolymer, a thermoplastic elastomer, and a thermoplastic non-elastic polymer.

When present, the amount of the at least one other polymer in the plurality of random loops may be less than about 90%, about 80%, about 70%, about 60%, about 50%, about 40%, about 30%, about 20%, about 10%, or about 5% of the total weight of the polymers present in the blend.

Examples of polymeric materials that the ethylene/α-olefin interpolymer composition may be blended with can include, for e.g., a polyester elastomer, polyamide elastomer and polyurethane elastomer, a low density polyethylene (LDPE), or a linear low density polyethylene (LLDPE). Such LDPEs or LLDPEs are commercially available under the tradenames DOWLEX™, DNDA, and ATTANE™, all of which are available from The Dow Chemical Company (Midland, Mich.).

Method of Manufacturing

The plurality of random loops may be formed by allowing continuous filaments to bend and come in contact with one another in a molten state, thereby being heat-bonded at random contact points. Thus, in some embodiments, the plurality of random loops is at least partially bonded with one another. The cushioning network structures provided herein can be prepared by any method known in the art. Examples of such as methods are described in U.S. Pat. Nos. 5,639,543, 6,378,150, 7,622,179, and 7,625,629, which are incorporated herein by reference.

In embodiments herein, the cushioning network structure comprising a plurality of random loops arranged in a three-dimensional orientation may be manufactured by providing an ethylene/α-olefin interpolymer composition according to one or more embodiments described herein, and forming the ethylene/α-olefin interpolymer composition into a plurality of random loops having a three-dimensional orientation to form a cushioning network structure.

In some embodiments, the cushioning network structure comprising a plurality of random loops arranged in a three-dimensional orientation may be manufactured by providing an ethylene/α-olefin interpolymer composition having a highest DSC temperature melting peak in the range of from 90.0° C. to 115.0° C., a zero shear viscosity ratio (ZSVR) in the range from 1.40 to 2.10, a density in the range of from 0.860 to 0.925 g/cc, a melt index (I2) in a range of from 1 to 25 g/10 minutes when measured according to ASTM D1238 at 190° C. and 2.16 kg, and a molecular weight distribution (Mw/Mn) in the range of from 2.0 to 4.5; and forming the ethylene/α-olefin interpolymer composition into a plurality of random loops having a three-dimensional orientation to form a cushioning network structure.

Figure 2:
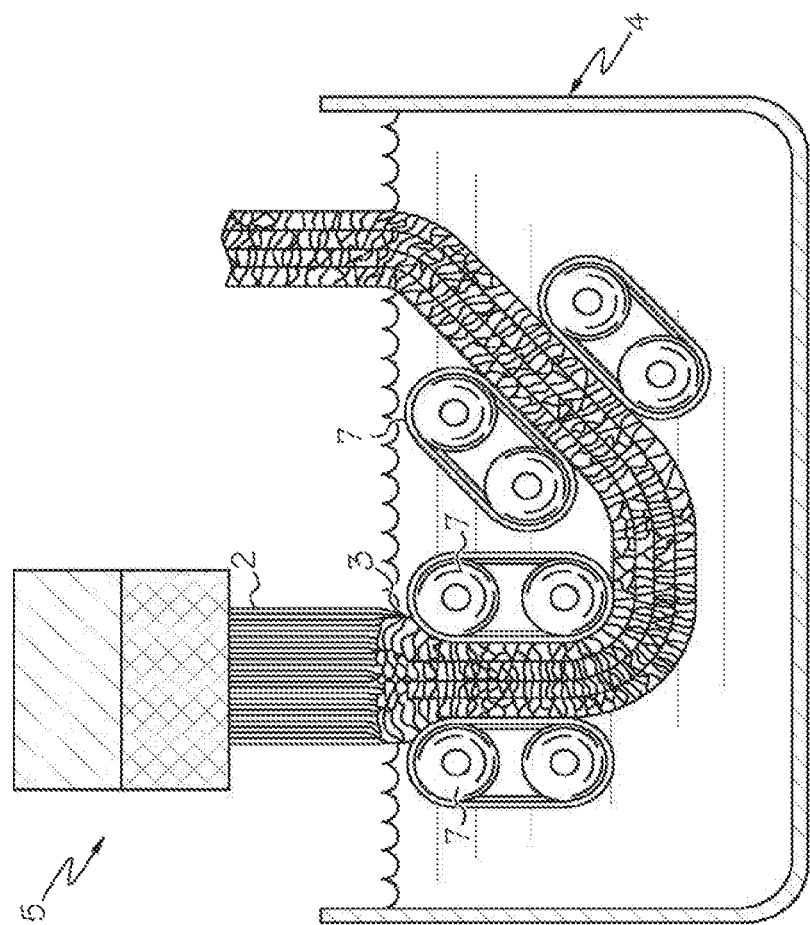
FIG. 2 schematically depicts bonding of the fibers formed in the water cooling unit.

An exemplary method for manufacturing a cushioning network structure is shown in FIGS. 1 and 2. Referring to FIGS. 1 and 2, molten ethylene/α-olefin interpolymer composition 2 is delivered to a water cooling unit 4. Upon cooling, the molten ethylene/α-olefin interpolymer composition 2 forms into three dimensional random loops 3. Thus, the water cooling of the molten ethylene/α-olefin interpolymer composition 2 facilitates formation of three-dimensional random loops 3 which at least partially bond to form the cushioning network structure. Without being bound by theory, it is believed that the ethylene/α-olefin interpolymer compositions described herein have a sufficiently low crystallization temperature in order to allow good bonding of the touching filament loops. This can allow for sufficient time prior to solidification in the water bath. The temperature of the water-bath can be used to control the solidification and annealing of the thus formed loop structure. It is believed that compositions with melting points above 100° C., yet with crystallization temperatures below 90° C. are suitable for use herein. The solidified material may stay for some time in the water bath to aid secondary crystallization of the polymer for at least 1 minute or more.

As shown in FIG. 2, the ethylene/α-olefin interpolymer composition 2 is delivered to the water cooling unit 4 via a drive mechanism 7 shown at least partially submerged (of course, it may be fully submerged), in the water cooling unit 4. The drive mechanism 7 may generally comprise at least one belt, a plurality of rollers, at least one conveyor, or combinations thereof. The drive mechanism 7 may be an underwater mechanism which constrains a thickness of the cushioning network structure. Considering the significant number of filaments being delivered to the water cooling unit 4, there may be significant bonding of the filaments during looping thereby creating a network structure. Without being bound by theory, it is believed that the cooling or solidifying of the 3D loop structure increases with the increasing depth into the water cooling unit 4.

As depicted in FIG. 2, the ethylene/α-olefin interpolymer composition 2 may be in pelletized form and are heated and melted in an extruder 10. The extruder 10 may generally include a hopper, screw and barrel, motor to turn the screw and heaters to heat the barrel. Of course, other configurations for extruder 10 may be used as is known in the art. The ethylene/α-olefin interpolymer composition pellets enter the hopper and are melted in the heated barrel due to heat and shear. As the flight clearance between the screw and barrel reduce going from the hopper to the die end, the solid pellets get softer and melt from the feed zone to the transition zone and finally, at the end near the die, the metering of the melt happens, like a pump, thus generating positive extrusion pressure as the melt exits the die 5.

The molten ethylene/α-olefin interpolymer composition exiting the die, which is now under positive pressure, may be transferred through a heated transfer pipe into the die 5. The die may consist of several rows of holes in series. The melt, which enters the die from a round transfer pipe, is uniformly distributed so it can exit the die from each of the individual holes uniformly. The die may be in a horizontal arrangement such that the melt exiting the die, which is now in the form of filaments, travels downward vertically before breaking the surface of the water in the water tank. The air gap or the distance between the die surface and the surface of water is adjustable.

Upon leaving the water cooling unit 4, the three-dimensional random loops 3 should be sufficiently bonded together to form the cushioning network structure. Excess water may be removed by various mechanisms. Moreover, there is a mechanism to cut the continuously forming structure into a desired length. The network structure provided herein can be a laminate or a composite of various network structures made of loops having different sizes, different deniers, different compositions, different densities, and so on as appropriately selected so as to meet the desired property.

The loop size of the plurality of random loops may vary based on industrial application, and specifically may be dictated by the diameter of the holes in the die. The loop size of the plurality of random loops may also be dictated by the polymer, melt temperature of the filaments coming out of the die, the distance between the die and water, the speed of the belts or rollers or other mechanism under water etc. In some embodiments, the random loop may have a diameter of about 0.1 mm to about 3 mm, or a diameter of about 0.6 mm to about 1.6 mm. The apparent density may range from about 0.016 to about 0.1 g/cm$^3$, or about 0.024 to about 0.1 g/cm$^3$ and can be achieved by adjusting various factors.

Test Methods
Melt Index

Melt index (I2), is measured in accordance with ASTM D 1238-10, Condition, 190° C./2.16 kg, and is reported in grams eluted per 10 minutes. Melt index (I10) is measured in accordance with ASTM D 1238-10, Condition 190° C./10 kg, and is reported in grams eluted per 10 minutes.
Density Density is measured in accordance with ASTM D792.
High Temperature Gel Permeation Chromatography (HT-GPC)

A PolymerChar (Valencia, Spain) high temperature Gel Permeation Chromatography system consisting of an infrared concentration detector (IR-5) was used for MW and MWD determination. The solvent delivery pump, the on-line solvent degas device, auto-sampler, and column oven were from Agilent. The column compartment and detector compartment were operated at 150° C. The columns were three PLgel 10 μm Mixed-B, columns (Agilent). The carrier solvent was 1,2,4-trichlorobenzene (TCB) with a flow rate of 1.0 mL/min. Both solvent sources for chromatographic and sample preparation contained 250 ppm of butylated hydroxytoluene (BHT) and were nitrogen sparged. Polyethylene samples were prepared at targeted polymer concentrations of 2 mg/mL by dissolving in TCB at 160° C. for 3 hour on the auto-sampler just prior the injection. The injection volume was 200 μL.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights. The polystyrene standard peak molecular weights were converted to polyethylene molecular weights using the following equation (as described in Williams and Ward, J. Polym. Sci., Polym. Let., 6, 621 (1968)):

$$M_{polyethylene} = A(M_{polystyrene})^B \quad (1)$$

Here B has a value of 1.0, and the experimentally determined value of A is around 0.42.

A third order polynomial was used to fit the respective polyethylene-equivalent calibration points obtained from equation (1) to their observed elution volumes. The actual polynomial fit was obtained so as to relate the logarithm of polyethylene equivalent molecular weights to the observed elution volumes (and associated powers) for each polystyrene standard.

Number-, weight- and z-average molecular weights are calculated according to the following equations:

$$\overline{Mn} = \frac{\sum_i Wf_i}{\sum_i (Wf_i / M_i)} \quad (2)$$

$$\overline{Mw} = \frac{\sum_i (Wf_i * M_i)}{\sum_i Wf_i} \quad (3)$$

$$\overline{Mz} = \frac{\sum_i (Wf_i * M_i^2)}{\sum_i (Wf_i * M_i)} \quad (4)$$

Where, $Wf_i$ is the weight fraction of the i-th component and $M_i$ is the molecular weight of the i-th component. The MWD is expressed as the ratio of the weight average molecular weight (Mw) to the number average molecular weight (Mn).

The accurate A value was determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 120,000 g/mol.

Crystallization Elution Fractionation (CEF) Method

Comonomer distribution analysis is performed with Crystallization Elution Fractionation (CEF) (PolymerChar in Spain) (B Monrabal et al, Macromol. Symp. 257, 71-79 (2007)). Ortho-dichlorobenzene (ODCB) with 600 ppm antioxidant butylated hydroxytoluene (BHT) is used as solvent. Sample preparation is done with autosampler at 160° C. for 2 hours under shaking at 4 mg/ml (unless otherwise specified). The injection volume is 300 μm. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second. CEF column is packed by the Dow Chemical Company with glass beads at 125 μm+6% (MO-SCI Specialty Products) with ⅛ inch stainless tubing. Glass beads are acid washed by MO-SCI Specialty with the request from The Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, >97.0, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in the following equation:

$$\text{Resolution} = \frac{\text{Peak temperature of } NIST\ 1475a - \text{Peak Temperature of Hexacontane}}{\text{Half-height Width of } NIST\ 1475a + \text{Half-height Width of Hexacontane}}$$

where the column resolution is 6.0.

Differential Scanning Calorimetry (DSC)

Differential Scanning Calorimetry (DSC) is used to measure the melting and crystallization behavior of a polymer over a wide range of temperatures. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (approx. 25° C.). The film sample is formed by pressing a "0.1 to 0.2 gram" sample at 175° C. at 1,500 psi, and 30 seconds, to form a "0.1 to 0.2 mil thick" film. A 3-10 mg, 6 mm diameter specimen is extracted from the cooled polymer, weighed, placed in a light aluminum pan (ca 50 mg), and crimped shut. Analysis is then performed to determine its thermal properties. The thermal behavior of the sample is determined by ramping the sample temperature up and down to create a heat flow versus temperature profile. First, the sample is rapidly heated to 180° C., and held isothermal for five minutes, in order to remove its thermal history. Next, the sample is cooled to −40° C., at a 10° C./minute cooling rate, and held isothermal at −40° C. for five minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature (Tm), peak crystallization temperature (Tc), heat of fusion (Hf) (in Joules per gram), and the calculated % crystallinity for polyethylene samples using: % Crystallinity=((Hf)/(292 J/g))×100. The heat of fusion (Hf) and the peak melting temperature are reported from the second heat curve. Peak crystallization temperature is determined from the cooling curve.

Apparent Density

A sample material is cut into a square piece of 15 cm×15 cm in size. The volume of this piece is calculated from the thickness measured at four points. The division of the weight by the volume gives the apparent density (an average of four measurements is taken).

Height Loss and 25% Deflection Force

The cushioning net structure is tested for height loss and 25% deflection force in accordance with ASTM D 3574, Test B2. After the initial measurement of height and 25% deflection force, the cushioning net structure is subjected to constant force pounding of 10,000 cycles, where the fatigue tester is calibrated to 220N and the pounder has a rate of 80 cycles/min. After waiting for 24 hours once pounding is completed, the cushioning net structure is tested for height and 25% deflection force again. Loss in height and 25% deflection force are measured in percent.

Storage Modulus

Sample Preparation

Rectangular shaped samples are compressed molded from granules at 190° C., and solidified at an average cooling rate of 15±2° C./min.

Method

The torsion tests are carried out in the rotational rheometer ARES by TA Instruments in a range of temperatures from 25° C. to melting point of the sample. The temperature is raised in steps of 5° C. with a soak time per step of 120 seconds. Dynamic oscillatory deformation of 0.1% at a frequency of 10 rad/s is applied to a rectangular sample of 30 mm length, 12.7 mm width and 2.8 mm thickness. The measured torque may be used to calculate the storage and loss modulus, G' and G", as a function of temperature.

Elastic Recovery

Resin pellets are compression molded following ASTM D4703, Annex A1, Method C to a thickness of approximately 5-10 mil. Microtensile test specimens of geometry as detailed in ASTM D1708 are punched out from the molded sheet. The test specimens are conditioned for 40 hours prior to testing in accordance with Procedure A of Practice D618.

The samples are tested in a screw-driven tensile tester using flat, rubber faced grips. The grip separation is set at 22 mm, equal to the gauge length of the microtensile specimens. The sample is extended to a strain of 100% at a rate of 100%/min and held for 30 s. The crosshead is then returned to the original grip separation at the same rate and held for 60 s. The sample is then strained to 100% at the same 100%/min strain rate.

Elastic recovery may be calculated as follows:

$$\text{Elastic Recovery} = \frac{(\text{Initial Applied Strain} - \text{Permanent Set})}{\text{Initial Applied Strain}} \times 100\%$$

Comonomer Distribution Constant (CDC) Method

Comonomer distribution constant (CDC) is calculated from comonomer distribution profile by CEF. CDC is defined as Comonomer Distribution Index divided by Comonomer Distribution Shape Factor multiplying by 100 as shown in the following equation:

$$CDC = \frac{\text{Comonomer Distribution Index}}{\text{Comonomer Distribution Shape Factor}} =$$

-continued $$\frac{\text{Comonomer Distribution Index}}{\text{Half Width}/Stdev} \times 100$$

wherein Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated according to the following steps:
(A) Obtain a weight fraction at each temperature (T) ($w_T(T)$) from 35.0° C. to 119.0° C. with a temperature step increase of 0.200° C. from CEF according to the following Equation:

$$\int_{35.0}^{119.0} w_T(T) dT = 1$$

(B) Calculate the median temperature ($T_{median}$) at cumulative weight fraction of 0.500, according to the following Equation:

$$\int_{35.0}^{T_{median}} w_T(T) dT = 0.5$$

(C) Calculate the corresponding median comonomer content in mole % ($C_{median}$) at the median temperature ($T_{median}$) by using comonomer content calibration curve according to the following Equation:

$$\ln(1 - \text{comonomer content}) = -\frac{207.26}{273.12 + T} + 0.5533$$

$$R^2 = 0.997$$

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average $M_w$ of 35,000 to 115,000 (measured via HT-GPC) at a comonomer content ranging from 0.0 mole % to 7.0 mole % are analyzed with CEF at the same experimental conditions specified in CEF experimental sections;
(E) Calculate comonomer content calibration by using the peak temperature ($T_p$) of each reference material and its comonomer content; The calibration is calculated from each reference material according to the following Equation:

$$\ln(1 - \text{comonomer content}) = -\frac{207.26}{273.12 + T} + 0.5533$$

$$R^2 = 0.997$$

wherein: $R^2$ is the correlation constant;
(F) Calculate Comonomer Distribution Index from the total weight fraction with a comonomer content ranging from $0.5 \cdot C_{median}$ to $1.5 \cdot C_{median}$, and if $T_{median}$ is higher than 98.0° C., Comonomer Distribution Index is defined as 0.95;
(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well-defined bimodal distribution where the difference in the peak temperatures is equal to or greater than the 1.1 times of the sum of half width of each peak, the half width of the inventive ethylene-based polymer composition is calculated as the arithmetic average of the half width of each peak;
(H) Calculate the standard deviation of temperature (Stdev) according the following Equation:

$$Stdev = \sqrt{\sum_{35.0}^{119.0} (T - T_p)^2}$$

An example of a comonomer distribution profile is shown in FIG. 23 of EP 2571690, which is incorporated herein by reference.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain.

The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{oB}}{\eta_{oL}} = \frac{\eta_{oB}}{2.29^{-15} M_{w-gpc}^{3.65}}$$

The ZSV value is obtained from creep test at 190° C. via the method described above. The Mw-gpc value is determined by the HT-GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

$^1$H NMR Method 3.26 g of stock solution is added to 0.133 g of polyolefin sample in 10 mm NMR tube. The stock solution is a mixture of tetrachloroethane-$d_2$ (TCE) and perchloroethylene (50:50, w:w) with 0.001M $Cr^{3+}$. The solution in the tube is purged with $N_2$ for 5 minutes to reduce the amount of oxygen. The capped sample tube is left at room temperature overnight to swell the polymer sample. The samples are dissolved at 115° C. with shaking. The samples are free of the additives that may contribute to unsaturation, e.g. slip agents such as erucamide.

The $^1$H NMR is run with a 10 mm cryoprobe at 120° C. on Bruker AVANCE 400 MHz spectrometer.

Two experiments are run to get the unsaturation: the control and the double pre-saturation experiments.

For the control experiment, the data is processed with exponential window function with LB=1 Hz, baseline was corrected from 7 to −2 ppm. The signal from residual $^1$H of TCE is set to 100, the integral $I_{total}$ from −0.5 to 3 ppm is used as the signal from whole polymer in the control experiment. The number of $CH_2$ group, $NCH_2$, in the polymer is calculated as following:

$$NCH_2 = I_{total}/2$$

Figure 3:
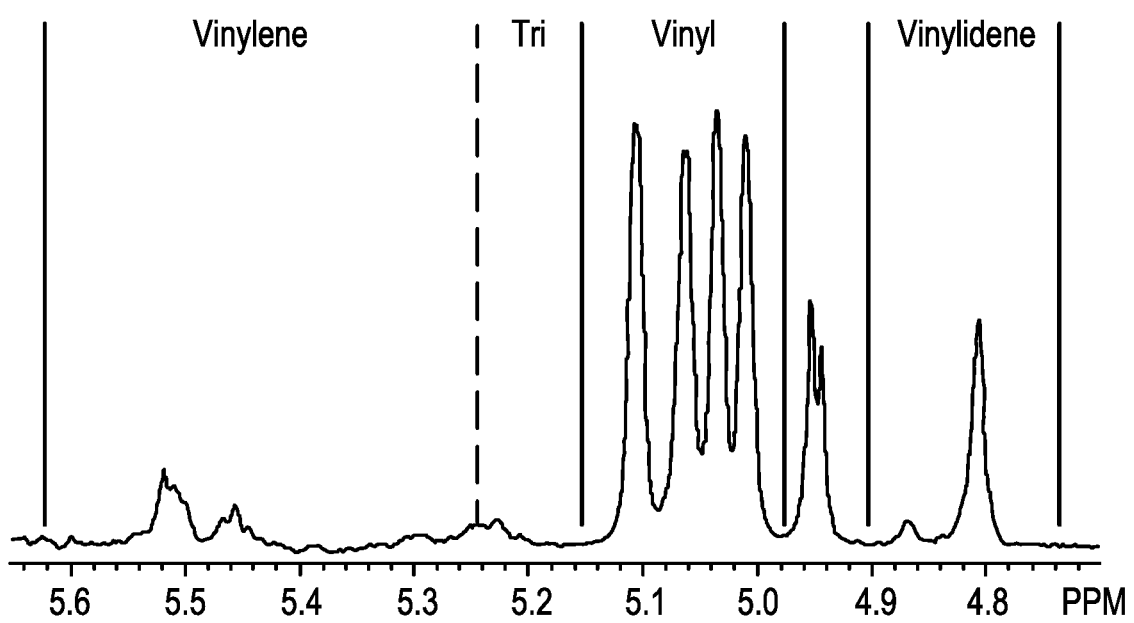
FIG. 3 is a $^1$H NMR spectrum showing the regions for integration.

For the double presaturation experiment, the data is processed with exponential window function with LB=1 Hz, baseline was corrected from 6.6 to 4.5 ppm. The signal from residual $_1$H of TCE is set to 100, the corresponding integrals for unsaturations ($I_{vinylene}$, $I_{trisubstituted}$, $I_{vinyl}$ and $I_{vinylidene}$) were integrated based on the region shown in the graph in FIG. 3.

The number of unsaturation unit for vinylene, trisubstituted, vinyl and vinylidene are calculated:

$$N_{vinylene} = I_{vinylene}/2$$

$$N_{trisubstituted} = I_{trisubstitute}$$

$$N_{vinyl} = I_{vinyl}/2$$

$$N_{vinylidene} = I_{vinylidene}/2$$

The unsaturation unit/1,000,000 carbons is calculated as following:

$$N_{vinylene}/1,000,000C = (N_{vinylene}/NCH_2)*1,000,000$$

$$N_{trisubstituted}/1,000,000C = (N_{trisubstituted}/NCH_2)*1,000,000$$

$$N_{vinyl}/1,000,000C = (N_{vinyl}/NCH_2)*1,000,000$$

$$N_{vinylidene}/1,000,000C = (N_{vinylidene}/NCH_2)*1,000,000$$

The requirement for unsaturation NMR analysis includes: level of quantitation is 0.47±0.02/1,000,000 carbons for Vd2 with 200 scans (less than 1 hour data acquisition including time to run the control experiment) with 3.9 wt. % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1$H signal from residual proton from TCT-d2. The control is run with ZG pulse, TD 32768, NS 4, DS 12, SWH 10,000 Hz, AQ 1.64 s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64 s, D1 1 s, D13 13 s. The modified pulse sequences for unsaturation with Bruker AVANCE 400 MHz spectrometer are shown below:

```
;lclprf2_zz
prosol relations=<lcnmr>
#include <Avance.incl>
"d12=20u"
"d11=4u"
1 ze
d12 pl21:f2
2 30m
d13
d12 pl9:f1
d1 cw:f1 ph29 cw:f2 ph29
d11 do:f1 do:f2
d12 pl1:f1
p1 ph1
go=2 ph31
30m mc #0 to 2 F0(zd)
exit
ph1=0 2 2 0 1 3 3 1
ph29=0
ph31=0 2 2 0 1 3 3 1
```

EXAMPLES

Inventive Resins

The inventive ethylene/alpha-olefin interpolymer compositions 1, 2, 3, & 4 were prepared via solution polymerization in a dual loop reactor system in the presence of a Zirconium-based catalyst system comprising [2,2'''-[1,3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)-Zirconium, represented by the following formula:

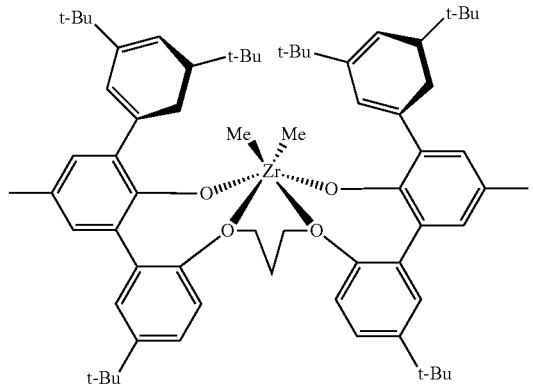

The polymerization conditions for the inventive ethylene/alpha-olefin interpolymer compositions 1, 2, 3, & 4 are reported in Tables 1 and 2. Referring to Tables 1 and 2, MMAO is modified methyl aluminoxane; and RIBS-2 is bis(hydrogenated tallow alkyl)methyl, tetrakis(pentafluorophenyl)borate(1-) amine.

TABLE 1

| 1. REACTOR FEEDS | Unit | Inventive Resin 1 | Inventive Resin 2 | Inventive Resin 3 | Inventive Resin 4 |
|---|---|---|---|---|---|
| Primary Reactor Feed Temperature | °C. | 29.98 | 29.89 | 29.99 | 30.00 |
| Primary Reactor Fresh Ethylene Flow | lbs/hr | 213.04 | 210.28 | 169.92 | 187.05 |
| Primary Reactor Total Ethylene Flow | lbs/hr | 221.92 | 217.95 | 176.72 | 194.08 |
| Comonomer Type Used | | 1-octene | 1-octene | 1-octene | 1-octene |
| Primary Reactor Fresh Comonomer Flow | lbs/hr | 70.91 | 77.39 | 70.59 | 74.15 |
| Primary Reactor Total Comonomer Flow | lbs/hr | 129.44 | 133.84 | 109.83 | 119.03 |
| Primary Reactor Comonomer/Olefin Ratio | % | 36.81 | 38.03 | 38.37 | 38.00 |
| Primary Reactor Feed Solvent/Ethylene Ratio | Ratio | 5.44 | 4.78 | 5.30 | 4.87 |
| Primary Reactor Fresh Hydrogen Flow | Standard $cm^3$/min | 8079.77 | 10859.95 | 5992.26 | 8326.62 |
| Primary Reactor Hydrogen Mole Percent | mol % | 0.60 | 0.82 | 0.56 | 0.70 |
| Secondary Reactor Feed Temperature | °C. | 25.15 | 25.52 | 25.00 | 25.22 |
| Secondary Reactor Fresh Ethylene Flow | lbs/hr | 171.10 | 170.89 | 212.99 | 197.00 |
| Secondary Reactor Total Ethylene Flow | lbs/hr | 174.79 | 174.77 | 217.75 | 201.49 |
| Secondary Reactor Fresh Comonomer Flow | lbs/hr | 0.00 | 0.00 | 0.00 | 0.00 |
| Secondary Reactor Total Comonomer Flow | lbs/hr | 25.39 | 28.76 | 28.64 | 29.42 |
| Secondary Reactor Comonomer/Olefin Ratio | % | 12.66 | 14.10 | 11.67 | 12.72 |
| Secondary Reactor Feed Solvent/Ethylene Ratio | Ratio | 2.68 | 2.67 | 2.71 | 2.67 |
| Secondary Reactor Fresh Hydrogen Flow | Standard $cm^3$/minute | 6103.32 | 4073.17 | 7704.34 | 6385.46 |
| Secondary Reactor Hydrogen Mole Percent | mol % | 0.48 | 0.32 | 0.53 | 0.48 |

TABLE 2

| | Unit | Inventive Resin 1 | Inventive Resin 2 | Inventive Resin 3 | Inventive Resin 4 |
|---|---|---|---|---|---|
| 2. REACTION | | | | | |
| Primary Reactor Control Temperature | °C. | 150.01 | 150.04 | 150.00 | 149.99 |
| Primary Reactor Ethylene Conversion | % | 83.84 | 84.79 | 88.79 | 90.18 |
| Primary Reactor Percent Solids | % | 13.53 | 15.10 | 15.49 | 16.57 |
| Primary Reactor Polymer Residence Time | min | 8.65 | 9.74 | 11.29 | 10.94 |
| Secondary Reactor Control Temperature | °C. | 189.95 | 189.96 | 189.94 | 189.94 |
| Secondary Reactor Ethylene Conversion | % | 85.18 | 86.54 | 88.16 | 87.01 |
| Secondary Reactor Percent Solids | % | 22.43 | 24.44 | 23.72 | 24.25 |
| Secondary Reactor Polymer Residence Time | min | 5.97 | 6.51 | 6.49 | 6.57 |
| Vent Ethylene Conversion | % | 93.46 | 94.02 | 93.45 | 93.37 |
| Primary Reactor Split | % | 41.32 | 40.70 | 37.46 | 41.17 |

TABLE 2-continued

| | Unit | Inventive Resin 1 | Inventive Resin 2 | Inventive Resin 3 | Inventive Resin 4 |
|---|---|---|---|---|---|
| 3. CATALYST | | | | | |
| Primary Reactor Catalyst Type | — | Zirconium-Based Catalyst | Zirconium-Based Catalyst | Zirconium-Based Catalyst | Zirconium-Based Catalyst |
| Primary Reactor Catalyst Flow | lbs/hr | 0.59 | 1.05 | 1.29 | 1.30 |
| Primary Reactor Catalyst Concentration | ppm | 199.99 | 100.00 | 100.00 | 100.00 |
| Primary Reactor Catalyst Efficiency | $10^6$ Lb | 1.58 | 1.75 | 1.28 | 1.42 |
| Primary Reactor Catalyst-1 Mole Weight | mw | 90.86 | 90.86 | 90.86 | 90.86 |
| Primary Reactor Co-Catalyst-1 Molar Ratio | Ratio | 1.20 | 1.13 | 1.34 | 1.23 |
| Primary Reactor Co-Catalyst-1 Type | — | RIBS-2 | RIBS-2 | RIBS-2 | RIBS-2 |
| Primary Reactor Co-Catalyst-1 Flow | lbs/hr | 0.62 | 0.53 | 0.75 | 0.70 |
| Primary Reactor Co-Catalyst-1 Concentration | ppm | 2999.36 | 2999.36 | 2999.36 | 2999.36 |
| Primary Reactor Co-Catalyst-2 Molar Ratio | Ratio | 9.99 | 9.98 | 9.99 | 10.04 |
| Primary Reactor Co-Catalyst-2 Type | — | MMAO | MMAO | MMAO | MMAO |
| Primary Reactor Co-Catalyst-2 Flow | lbs/hr | 0.70 | 0.63 | 0.77 | 0.78 |
| Primary Reactor Co-Catalyst-2 Concentration | ppm | 498.18 | 498.18 | 498.18 | 498.18 |
| Secondary Reactor Catalyst Type | — | Zirconium-Based Catalyst | Zirconium-Based Catalyst | Zirconium-Based Catalyst | Zirconium-Based Catalyst |
| Secondary Reactor Catalyst Flow | lbs/hr | 0.74 | 1.58 | 1.60 | 1.60 |
| Secondary Reactor Catalyst Concentration | ppm | 199.99 | 100.00 | 100.00 | 100.00 |
| Secondary Reactor Catalyst Efficiency | $10^6$ Lb | 1.79 | 1.69 | 1.73 | 1.63 |
| Secondary Reactor Co-Catalyst-1 Molar Ratio | Ratio | 1.20 | 1.20 | 1.20 | 1.20 |
| Secondary Reactor Co-Catalyst-1 Type | — | RIBS-2 | RIBS-2 | RIBS-2 | RIBS-2 |
| Secondary Reactor Co-Catalyst-1 Flow | lbs/hr | 0.78 | 0.83 | 0.84 | 0.84 |
| Secondary Reactor Co-Catalyst-1 Concentration | ppm | 2999.36 | 2999.36 | 2999.36 | 2999.36 |
| Secondary Reactor Co-Catalyst-2 Molar Ratio | Ratio | 5.05 | 4.74 | 5.78 | 4.69 |
| Secondary Reactor Co-Catalyst-2 Type | — | MMAO | MMAO | MMAO | MMAO |
| Secondary Reactor Co-Catalyst-2 Flow | lbs/hr | 0.90 | 0.90 | 1.09 | 0.90 |
| Secondary Reactor Co-Catalyst-2 Concentration | ppm | 248.12 | 248.12 | 248.12 | 248.12 |
| 4. POLYMER | | | | | |
| GI200 Average Gel Area | mm$^2$/24.6 cm$^3$ | 0.74 | 1.57 | 0.00 | 0.70 |
| GI200 Std Dev Gel Area | mm$^2$/24.6 cm$^3$ | 2.68 | 4.46 | 0.00 | 1.74 |

Comparative Resins

Comparative resin A is an ethylene/alpha-olefin block copolymer having a density of 0.877 g/cc and a melt index, I2, of 15 g/10 min (190° C./2.16 kg), which is available as INFUSE™ 9817 from The Dow Chemical Company (Midland, Mich.).

Comparative resin B is an ethylene/alpha-olefin copolymer having a density of 0.910 g/cc and a melt index, I2, of 15 g/10 min (190° C./2.16 kg), which is available as ELITE™ 5815 from The Dow Chemical Company (Midland, Mich.)).

Comparative resin C is an ethylene-based plastomer having a density of 0.907 g/cc and a melt index, I2, of 12 g/10 min (190° C./2.16 kg), which is available as KERNEL™ KS571 from Japan Polychem Corporation (Japan).

Tables 3 and 4 list properties of the inventive resins as well as the comparative resins, respectively.

TABLE 3

|  | Inventive Resin 1 | Inventive Resin 2 | Inventive Resin 3 | Inventive Resin 4 |
|---|---|---|---|---|
| Density (g/cm$^3$) | 0.9077 | 0.9056 | 0.9074 | 0.9062 |
| I$_2$ (g/10 minutes) | 8.68 | 14.33 | 8.11 | 14.42 |
| I$_{10}$/I$_2$ | 7.06 | 6.90 | 6.75 | 6.32 |
| Unsaturation/1,000,000 C | | | | |
| vinylene | 9 | 7 | 5 | 8 |
| Trisubstitute | 9 | 7 | 8 | 8 |
| vinyl | 43 | 39 | 41 | 41 |
| vinylidene | 6 | 5 | 4 | 4 |
| Total unsaturation | 67 | 58 | 60 | 62 |
| HT-GPC | | | | |
| M$_n$ | 22851 | 20558 | 24432 | 22017 |
| M$_w$ | 59324 | 50574 | 58398 | 50420 |
| M$_z$ | 119386 | 95081 | 108294 | 88651 |
| M$_w$/M$_n$ | 2.60 | 2.46 | 2.39 | 2.29 |
| Rheology | | | | |
| Viscosity (Pa · s) | 966 | 474 | 981 | 527 |
| Mw-GPC | 59324 | 50574 | 58398 | 50420 |
| ZSVR | 1.60 | 1.40 | 1.72 | 1.58 |
| DSC | | | | |
| Highest T$_m$ peak (° C.) | 102.8 | 101.5 | 107.0 | 105.2 |
| Tc (° C.) | 82.69 | 80.99 | 84.24 | 82.5 |
| ΔTm − Tc | 20.11 | 20.52 | 22.77 | 22.7 |
| Heat of melting (J/g) | 117.9 | 114.1 | 115.2 | 113.2 |
| Other Properties | | | | |
| Elastic recovery (%) 100% strain | 70.3 | 61.3 | 70.0 | 66.2 |
| G'(25° C.)/G'(100° C.) | 29.5 | 56.8 | 22.5 | 32.6 |
| CEF | | | | |
| Comonomer distribution Index | 0.886 | 0.892 | 0.891 | 0.900 |
| Stdev | 9.996 | 10.46 | 14.342 | 9.669 |
| Half width, ° C. | 11.796 | 14.256 | 22.818 | 23.243 |
| Halfwidth/Stdev | 1.18 | 1.363 | 1.591 | 2.404 |
| CDC (Comonomer Distribution Constant) | 75.1 | 65.5 | 56 | 37.4 |

TABLE 4

|  | Comparative Resin A | Comparative Resin B | Comparative Resin C |
|---|---|---|---|
| Density (g/cm³) | 0.877 | 0.910 | 0.907 |
| I₂ (g/10 minutes) | 15 | 15 | 12 |
| I₁₀/I₂ | 7.294 | 6.750 | 5.650 |
| Unsaturation/1,000,000 C | | | |
| vinylene |  | 47 | 247 |
| Trisubstitute |  | 39 | 164 |
| vinyl |  | 129 | 166 |
| vinylidene |  | 43 | 102 |
| Total unsaturation |  | 258 | 679 |
| HT-GPC | | | |
| $M_n$ |  | 18488 | 21950 |
| $M_w$ |  | 54345 | 54561 |
| $M_z$ |  | 133502 | 93822 |
| $M_w/M_n$ |  | 2.94 | 2.49 |
| Rheology | | | |
| Viscosity (Pa · s) |  | 598 | 604 |
| Mw-GPC |  | 54345 | 54561 |
| ZSVR |  | 1.36 | 1.35 |
| DSC | | | |
| Highest $T_m$ peak (° C.) | 120.0 | 123.4 | 96.7 |
| Tc (° C.) | 104 | 98.93 | 78.6 |
| ΔTm – Tc | 16 | 24.47 | 18.1 |
| Heat of melting (J/g) | 50.42 | 129.30 | 115.40 |
| Other Properties | | | |
| Elastic recovery (%) 100% strain | 78.3 | 62.6% | 72.0 |
| G'(25° C.)/G'(100° C.) | 5.87 | 38.67 | 1084.96 |
| CEF | | | |
| Comonomer Distribution Index | 0.604 | 0.78 | 0.962 |
| Stdev, ° C. | 17.507 | 12.756 | 7.393 |
| Half Width, ° C. | 25.027 | 8.91 | 11.058 |
| Halfwidth/Stdev | 1.43 | 0.698 | 1.496 |
| CDC (Comonomer Distribution Constant) | 42.2 | 111.7 | 64.3 |

The inventive and comparative resins were used to make cushioning net structures. The cushioning net structures were made according to the procedure described in U.S. Pat. No. 7,625,629, which is incorporated by reference herein in its entirety. As shown in Table 5 below, the cushioning net structures were tested for height loss and 25% deflection force. As shown, the inventive resins demonstrate a lower height loss and/or a lower 25% deflection force over the comparative resins.

TABLE 5

|  | Inventive Resin 1 | Inventive Resin 2 | Inventive Resin 3 | Inventive Resin 4 | Comparative Resin A | Comparative Resin B | Comparative Resin C |
|---|---|---|---|---|---|---|---|
| Apparent Density (lb/ft³) | 2.5 | 2.5 | 2.4 | 2.4 | not measured | 2.4 | 2.3 |
| Height Loss (%) | 3.6 | 3.1 | 3.3 | 3.2 | not measured | 2.4 | 4.3 |
| 25% Deflection Force (%) | 19.4 | 20.7 | 23.7 | 21.3 | not measured | 28.6 | 20.9 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention

The invention claimed is:

1. A cushioning network structure comprising a plurality of random loops arranged in a three-dimensional orientation, wherein the plurality of random loops are formed from an ethylene/α-olefin interpolymer composition having a highest DSC temperature melting peak in the range of from 90.0° C. to 115.0° C.; a zero shear viscosity ratio (ZSVR) in the range from 1.40 to 2.10; a density in the range of from 0.860 to 0.925 g/cc; a melt index (I2) in a range of from 1 to 25 g/10 minutes when measured according to ASTM D1238 at 190° C. and 2.16 kg; and a molecular weight distribution (Mw/Mn) in the range of from 2.0 to 4.5;

wherein the ethylene/α-olefin interpolymer composition comprises a first homogeneously branched random ethylene/α-olefin copolymer and a second homogeneously branched random ethylene/α-olefin copolymer.

2. The cushioning network structure of claim 1, wherein the first homogeneously branched random ethylene/α-olefin copolymer has a density from 0.860 g/cc to 0.925 g/cc.

3. The cushioning network structure of claim 1, wherein the first homogeneously branched random ethylene/α-olefin copolymer has a melt index of from 0.2 g/10 min to 25 g/10 min.

4. The cushioning network structure of claim 1, wherein the first homogeneously branched random ethylene/α-olefin copolymer has a density that is at least 0.005 g/cc lower than the second homogeneously branched random ethylene/α-olefin copolymer.

5. The cushioning network structure of claim 1, wherein the ethylene/α-olefin interpolymer composition has a Comonomer Distribution Constant (CDC) in the range of from 25 to 100.

6. The cushioning network structure of claim 1, wherein the ethylene/α-olefin interpolymer composition has a vinyl unsaturation of less than 100 vinyls per 1,000,000 carbon atoms present in the backbone of the ethylene/α-olefin interpolymer composition.

7. The cushioning network structure of claim 1, wherein the ethylene/α-olefin interpolymer composition has a difference between the highest DSC temperature melting peak, Tm, and highest DSC temperature crystallization peak, Tc, of greater than 19.0° C.

8. The cushioning network structure of claim 1, wherein each of the plurality of random loops in the cushioning network structure has a diameter of about 0.1 mm to about 3 mm.

9. The cushioning network structure of claim 1, wherein the cushioning network structure has an apparent density in a range of about 0.016 g/cm$^3$ to about 0.1 g/cm$^3$.

10. A method of manufacturing a cushioning network structure comprising a plurality of random loops arranged in a three-dimensional orientation, wherein the method comprises:
    providing an ethylene/α-olefin interpolymer composition having a highest DSC temperature melting peak in the range of from 90.0° C. to 115.0° C.; a zero shear viscosity ratio (ZSVR) in the range from 1.40 to 2.10; a density in the range of from 0.860 to 0.925 g/cc, a melt index (I2) in a range of from 1 to 25 g/10 minutes when measured according to ASTM D1238 at 190° C. and 2.16 kg, a molecular weight distribution (Mw/Mn) in the range of from 2.0 to 4.5, wherein the ethylene/α-olefin interpolymer composition comprises a first homogeneously branched random ethylene/α-olefin copolymer and a second homogeneously branched random ethylene/α-olefin copolymer; and
    forming the ethylene/α-olefin interpolymer composition into a plurality of random loops having a three-dimensional orientation to form a cushioning network structure.

11. The method of claim 10, wherein the first homogeneously branched random ethylene/α-olefin copolymer has a density from 0.860 g/cc to 0.925 g/cc.

12. The method of claim 10, wherein the first homogeneously branched random ethylene/α-olefin copolymer has a melt index of from 0.2 g/10 min to 25 g/10 min.

13. The method of claim 10, wherein the first homogeneously branched random ethylene/α-olefin copolymer has a density that is at least 0.005 g/cc lower than the second homogeneously branched random ethylene/α-olefin copolymer.

14. The method of claim 10, wherein the ethylene/α-olefin interpolymer composition has a Comonomer Distribution Constant (CDC) in the range of from 25 to 100.

15. The method of claim 10, wherein the ethylene/α-olefin interpolymer composition has a vinyl unsaturation of less than 100 vinyls per 1,000,000 carbon atoms present in the backbone of the ethylene/α-olefin interpolymer composition.

16. The method of claim 10, wherein the ethylene/α-olefin interpolymer composition has a difference between the highest DSC temperature melting peak, Tm, and highest DSC temperature crystallization peak, Tc, of greater than 19.0° C.

17. The method of claim 10, wherein each of the plurality of random loops in the cushioning network structure has a diameter of about 0.1 mm to about 3 mm.

18. The method of claim 10, wherein the cushioning network structure has an apparent density in a range of about 0.016 g/cm$^3$ to about 0.1 g/cm$^3$.

* * * * *